United States Patent [19]

McBurney

[11] Patent Number: 5,590,043
[45] Date of Patent: Dec. 31, 1996

[54] SATELLITE POSITIONING SYSTEM FILTER

[75] Inventor: Paul W. McBurney, Santa Clara, Calif.

[73] Assignee: Trimble Navigation Limited, Sunnyvale, Calif.

[21] Appl. No.: 78,512

[22] Filed: Jun. 17, 1993

[51] Int. Cl.⁶ .............................. G06F 165/00; G01S 5/02
[52] U.S. Cl. ..................... 364/449.1; 342/357; 342/457; 364/572; 364/449.7
[58] Field of Search ..................................... 364/443, 449, 364/572, 574, 724.01, 724.02; 342/357, 450, 451, 457

[56] References Cited

U.S. PATENT DOCUMENTS

| | | | |
|---|---|---|---|
| 5,296,861 | 3/1994 | Knight | 342/357 |
| 5,323,163 | 6/1994 | Maki | 342/357 |

*Primary Examiner*—Michael Zanelli
*Attorney, Agent, or Firm*—John Schipper

[57] ABSTRACT

A method, implementable on a computer, for filtering time-varying location solution coordinates $P_{x,n}$, $P_{y,n}$, and $P_{z,n}$, determined by a Satellite Positioning System (SATPS, usually GPS or GLONASS), which operates in a static mode and a dynamic mode, to reduce large discontinuities and control the rate at which a changing sequence of measurement errors can induce a change in a sequence of location solutions. As an initial step, SATPS location solutions $P_{x,n}$, $P_{y,n}$, and $P_{z,n}$, and SATPS velocity solutions $V_{x,n}$, $V_{y,n}$, and $V_{z,n}$ are generated for selected fix times $t=t_n$ with essentially no time lag in these solutions, when recent measurements are available from all satellites in the solution constellation. Sequences of filtered location coordinates $\{P^\wedge_{x,n}\}$, $\{P^\wedge_{y,n}\}$, and $\{P^\wedge_{z,n}\}$ are formed, to reduce discontinuities that occur with a changing set of measurement errors caused by one or more of the following perturbing events: (1) change of the satellites in the SATPS solution constellation, (2) change of the location solution from a three-dimensional solution to a two-dimensional solution, (3) change of the location solution from a two-dimensional solution to a three-dimensional solution, (4) change in availability of differential SATPS info, (5) appearance or disappearance of Selective Availability, (6) appearance or disappearance of receiver noise in satellite measurements, (7) appearance or disappearance of multipath signals in satellite measurements, and (8) a significant change in a latency error for any location or velocity coordinate of the solution. Filtered location coordinates $P^\wedge_{x,n}$, $P^\wedge_{y,n}$, and $P^\wedge_{z,n}$ are formed as linear combinations, using selected weights, of the unfiltered location solutions $P_{x,n}$, $P_{y,n}$ and $P_{z,n}$ with predicted location coordinates $P^{\wedge-}_{x,n}$, $P^{\wedge-}_{y,n}$ and $P^{\wedge-}_{z,n}$ using the average velocities $(V_{x,n}+V_{x,n-1})/2$, $(V_{y,n}+V_{y,n-1})/2$ and $(V_{z,n}+V_{z,n-1})/2$ in the time interval $t_{n-1} \leq t \leq t_n$ between two location fix times $t_n$.

23 Claims, 18 Drawing Sheets

5,590,043

SATELLITE POSITIONING SYSTEM FILTER

FIELD OF THE INVENTION

This invention relates to adaptive filters for use in a satellite positioning system.

BACKGROUND OF THE INVENTION

A Satellite Positioning System (SATPS), which includes a Global Positioning System (GPS) and a Global Orbiting Navigational Satellite System (GLONASS) as particular implementations, uses signals received from three or more SATPS satellites to determine either two or three location coordinates of the SATPS antenna receiving these signals and also the receiver time offset from the system time, based upon tracking a particular digital code and/or frequency that is unique for each such satellite, plus the known location of each such SATPS satellite as a function of time in its particular orbit. One implementation of the SATPS, GPS, is discussed by Tom Logsdon in *The NAVSTAR Global Positioning System,* Van Nostrand Reinhold, 1992, pp. 1–90, incorporated by reference herein. Particular aspects of GPS and GLONASS are discussed in detail below.

Within an SATPS, two methods are available for computing the location solution for an SATPS antenna, based upon SATPS-derived pseudorange and Doppler shift measurements. The first method is characterized as a snapshot or least squares solution in which independent location and velocity solutions are computed, using only present measurements (valid at the present measurement epoch or "snapshot" time of solution). In this case, the location and velocity solutions in one epoch are independent of these solutions during any other epoch.

In almost all receivers using snapshot solutions, some filtering of the pseudorange measurements with Doppler is performed. Doppler measurements are typically at least 10–20 times less noisy than pseudorange measurements. However, even with measurement smoothing, the dynamic errors between solutions are still independent when concurrent measurements are obtained for each satellite used in the solution at each epoch. If a satellite is briefly obscured, most receivers will re-use a previous pseudorange in the solution by propagating the last measurement forward in time with the Doppler measurement for a brief time before a new satellite solution set is chosen. During this time, accelerations will induce correlated errors in consecutive snapshot solutions. However, most of the time, the snapshot solution sequence can be modelled as an independent sequence of position estimates.

In an alternative approach, elaborate filtering, such as Kalman filtering, is used to assimilate measurement information and to update the location and/or velocity solutions, based in part on solutions determined at preceding measurement times. This filtering system contains a model of the measurement errors and a model of the nominal dynamical motion that the SATPS signal receiver will experience. These models are used to adjust the amount of uncertainty that accumulates between measurement times when the solution is updated. The size of these uncertainties determines the size of the gain factors used to blend the new measurements with the previous filtered solutions, in order to generate new filtered solutions.

The Kalman filter approach produces a filtered solution with a time constant which is based upon the nominal vehicle motion and measurement error models. By contrast, the snapshot approach makes no assumptions about the vehicle dynamics and produces an unfiltered solution. These two approaches produce different behaviors at equivalent times for non-steady state situations caused by satellite constellation switches or by other dynamical changes.

The Kalman filter modelling process requires that the parameters to be estimated can be modelled as random variables with driving functions that are in the form of a linear system driven by white noise. It is not possible to explicitly model acceleration induced position and velocity errors with such a model because acceleration produces a deterministic change in the position and velocity. Most filters that try to model acceleration induced errors incorporate some nominal acceleration-like model to produce a desired amount of uncertainty between fixes.

When larger-than-expected residuals occur between the observed and predicted measurements due to unmodeled dynamics or measurement errors, some filters adapt their error models by increasing the dynamic or measurement uncertainty. which increases the gain and decreases the time lag in the solution. Some filters are not adaptive, in which case the filter solution may lag the true dynamics for a short time after the acceleration occurs if the error model is too small for the dynamics at hand. Alternatively, the filter model may assume the presence of worst case dynamics for the particular application. In this instance, the gains would always be large enough to assimilate large, acceleration-driven residuals, and the time lag would be minimized, but the solution would be overly noisy when the dynamics were more benign. Thus, the filtered solution does not explicitly prevent step-like jumps when unmodeled measurements errors are experienced because the filtered solution must keep the gains on the measurements large enough to react to sudden changes in the vehicle motion.

The so-called snapshot approach is insensitive to system dynamics, because the solution is based solely upon current measurements, and the solution has no lag during dynamics if current measurements are maintained for each satellite in the solution. However, snapshot solutions experience jumps in position when the set of measurement errors associated with the satellites used in the solution changes. The position jumps with the snapshot solution are usually worse than with the Kalman filter solution because the measurements are weighted more heavily in the snapshot solution than in the filtered solution.

Systems modelled by either of these approaches will experience sudden jumps in the SATPS-determined location solution when the particular satellites used for the solution (the "solution constellation" of satellites) changes. This is commonly caused by a temporary blockage of one or more of the SATPS signals received from the satellites in the solution constellation. After a short hold-off to minimize the frequency of constellation switching (during which old measurements may be temporarily re-used), the receiver will pick a new set of satellites from tile available satellites for the location solution, and as a result, a different position offset may occur. If the blocked satellites become visible again, the receiver mnay choose the previous solution set again resulting in a jump back to the previous offset. When a solution constellation changes, a jump in indicated location coordinates occurs because a different set of errors is used in the new solution.

A description of the types of errors associated with each measurement is appropriate to understand how the location jumps occur. Ideally, the system would measure the range from the receiver to the satellite with no error, and any combination of satellites with reasonable geometry would generate the same exact solution. In reality, each satellite has a somewhat different set of associated errors, and different constellations of satellites will produce different location errors, according to the size of the measurement errors and the how each satellite is weighted in the solution according to the relative geometry of the satellites, which changes for each set of satellites.

With a conventional SATPS, the total measurement error for a particular satellite will have a number of contributions. The receiver and antenna will experience some receiver noise and multipath signal errors. Inaccuracies in the satellite position and clock models, and time-of-flight errors due to propagation through the ionosphere and troposphere produce additional errors. The ionosphere and troposphere propagation errors can be reduced with careful modelling of such effects. However, the inaccuracy of these models increases markedly as the particular satellite approaches the horizon and the associated air mass for signal propagation increases. The error contributed by ionospheric propagation delay can be as large as 30 meters, and the ionospheric model generally removes about 50 percent of the error. The error contributed by tropospheric propagation delay is much smaller and more accurately modelled.

The U.S. Department of Defense ("DoD") has added an additional error source to GPS known as Selective Availability (SA). This error dithers the transmitted GPS signal to produce a sinusoidal-like range error with an amplitude of up to 50 meters and a period of roughly 100–300 seconds. The effect of SA on range and range-rate is coherent, so the effect on the Doppler measurement is the derivative of the effect on the pseudorange (this makes the error almost impossible to remove with a single antenna system). In a stand-alone GPS receiver, SA is the largest error source. SA errors may also be induced by corrupting the parameters sent by the satellite and used to compute the satellite location and clock state. The U.S. DoD maintains that SA induced horizontal position errors will be less than 100 meters 95 percent of the time, when good satellite geometry is available. However, position errors on the order of 500 meters have been observed when the satellite geometry is higher than normal. Thus, SA can induce very large jumps between positions with good and poor geometry.

Where differential SATPS ("DSATPS") information is available, most of the satellite errors and the propagation errors can be removed or substantially reduced before the location solutions are computed. However, the inaccuracy of a DSATPS solution may increase to 25 meters and beyond as the distance between a reference receiver and a mobile receiver increases above approximately 100 kilometers. The receiver noise errors and multipath signal errors are not reduced using DSATPS solutions. Thus, even with DSATPS, some measurement errors will remain which can induce position jumps when the solution constellation changes.

Some workers in signal processing have developed techniques that use rate of change of a variable or similar techniques to vary the approach used for subsequent processing of signals received. U.S. Pat. No. 4,776,035, issued to Duggan, discloses a satellite signal lockup detection system that senses the onset of, and avoids, power saturation in a satellite signal channel due to perceived signal fading. This signal fading could occur because of the presence of rain or other weather variables that attenuate such signals. The rate of change of power output from an Earth station that communicates with the satellite is continuously monitored to determine approach to a power "avalanche" condition that can ultimately lead to lockup. When this rate of change exceeds a selected threshold value, Lhe system places an upper limit on signal power that is close to, but below, the power required for initiation of avalanche.

An adaptive signal modification system for discriminating between high level and low level signals is disclosed by Nakamura in U.S. Pat. No. 4,939,750. An input signal is summed with a compensation signal that is adaptively determined from the inverse of a running average of preceding input signals.

Begin, in U.S. Pat. No. 4,995,019, discloses a time period measurement system with adaptive averaging of the measurements. The time period measured is expressed as an integral number of units of constant length $\Delta t_u$ plus a fractional part $f\Delta t_u$ of that unit with $0 \leq f < 1$. The fractional part is faltered adapfively to provide an average value of the fraction number f that depends upon the presently measured fraction number and previously measured fraction numbers.

Chung discloses a system for determining digital filter coefficients, using an iterative, adaptive process, in U.S. Pat. No. 5,058,047. The filter coefficients are changed during each iteration by an amount that depends upon the stochastic average of certain gradient signals. The gradient signals are formed as a weighted sum of (1) the product, $\epsilon(j) \times (j)$, of the instantaneous values of a signal error function and a signal input function at observation time j and (2) the stochastic average of the product $\epsilon(j-1) \times (j-1)$, formed at the preceding observation time j–1, with adaptively determined weighting factors. The stochastic average of the product $\epsilon(j-1) \times (j-1)$ uses the cross-correlation between the error signal and the input signal for preceding values.

Adaptive suppression of threshold impulse noise is disclosed by Barton et al in U.S. Pat. No. 5,119,321. A sample-and-hold circuit receives and stores a sequence of input digital signals. In one embodiment, consecutive signal input times are chosen so that the probability of noise spikes occurring in any two consecutive signal input time intervals is negligible, and a new input signal is compared with selected preceding input signals. In another embodiment, the new input signal is compared with a running average of the signals in the sample-and-hold circuit. If the new input signal differs from the comparison signal by too large an amount, the system concludes that the new signal contains impulse noise and discards the new input signal.

U.S. Pat. No. 5,138,555, issued to Albrecht, discloses a helmet-mounted display, worn by an aircraft pilot, that performs adaptive prediction tracking, using a Least Mean Squares algorithm to predict the helmet location a few tenths of a second in the future. Only helmet location data, not velocity or acceleration data, are used for this purpose. The algorithm relies in part upon helmet movement patterns observed and stored at earlier times.

An adaptive digital filtering system, with a variable time increment between consecutive observations varying inversely with the rate of change of the input signal, is disclosed by Countryman in U.S. Pat. No. 5,150,317. The time increment varies between a minimum value, used for relatively high rates of change of the input signal, and a maximum value, used for relatively low rates of change of the input signal. Between these minimum and maximum values, the time increment varies linearly with a parameter A that depends upon the square of the rate of change of one or more selected bits of the digital input signal.

Ng discloses a technique for signal prediction in a time-varying system, using a Maximum Likelihood (ML) algorithm to estimate certain system parameters, in U.S. Pat. No. 5,150,414. A time-dependent, monotonically decreasing weighting function $w(t)=at^2+bt+c$ and its complement 1−w(t) are used to weight open loop data (complete data sets) and closed loop data (incomplete data sets), respectively, used in the ML computation, to reflect the cumulative importance of these data sets and to reduce ML computation time.

U.S. Pat. No. 5,152,292, issued to Karp, discloses an adaptive rejection filter for rejection of "flash" (unwanted) color imaging signals in an ultrasound imaging system. Flash signals often arise from a Doppler-sensed velocity of a moving part of the ultrasound target that is too high relative to the velocities of other parts of the target. The system assigns a flash strength to each signal portion of a target scan line, depending upon the magnitude and rate of change of that signal portion. For a given scan line, the number of flash strengths in each of a selected group of flash strength ranges is analyzed and compared, in order to assign a representative flash strength to that scan line. The collection of signals for each scan line is stored and time delayed until the representative flash strength is determined for that scan line. This collection of scan line signals is then filtered to reduce the rate of change of selected scan line portions below a selected upper limit (or above a selected lower limit) on signal rate of change, in order to provide an ultrasound image that contains little or no flash. The system includes a persistence signal moclifier that blends the present, unfiltered signal (possibly containing flash) with a previous persistence signal in order to smooth the flash rejection level(s) as time passes.

These patents disclose interesting features, such as use of magnitude or rate-of-change of an input variable for adaptively determining filter values, or use of running averages of preceding input signals. However, these patents disclose systems that provide (1) discard of the new input signal if the change is too great or (2) modification of the new input signal value so that it lies in an acceptable range. What is needed is a system that (1) allows acceptance, after a time, of a persistent input signal whose value differs substantially from the preceding input signal values and (2) provides a filtered signal that makes a relatively smooth transition between the average of preceding input signal values and the average value of new, persistent input signal values that differ greatly froran the average of the preceding input signal values.

SUMMARY OF THE INVENTION

These needs are met by the invention, which provides a method for filtering time-varying location coordinates $P_{x,n}$, $P_{y,n}$, and $P_{z,n}$, determined by a Satellite Positioning System (SATPS) to reduce large discontinuities in a sequence of successive values of the location coordinate. The SATPS operates in a static mode, where the SATPS receiver is stationary or is moving at a speed lower than a selected speed threshold such an normal walking speed, or in a dynamic mode, where the receiver moves at a speed higher than the threshold. The system generates a three-dimensional location coordinate solution $P_{x,n}$, $P_{y,n}$, and $P_{z,n}$, and a corresponding velocity coordinate solution $V_{x,n}$, $V_{y,n}$, and $V_{z,n}$ with substantially no time lag in these solutions, when measurements are available from all satellites in the solution constellation. The system then filters the location coordinates to obtain sequences of location coordinates $\{P^A_{x,n}\}$, $\{P^A_{y,n}\}$, and $\{P^A_{z,n}\}$ that are smoothed to reduce discontinuities that occur due to one or more of the following perturbations on the location solution: (1) change of the satellites in the solution constellation, (2) change of the location solution from a three-dimensional solution to a two-dimensional solution, (3) change of the location solution from a two-dimensional solution to a three-dimensional solution, (4) availability, or loss of availability, of differential SATPS information, (5) appearance or disappearance of Selective Availability, (6) presence of receiver noise in the SATPS signals received from the satellites in the solution constellation, (7) appearance or disappearance of multipath signals at the SATPS receiver, and (8) appearance of a significant latency error in the location and/or velocity solutions.

BRIEF DESCRIPTION OF THE DRAWINGS

FIGS. 2A-1, 2A-2, 2B-1, 2B-2, 2C-1, 2C-2, 2D-1, 2D-2, 2E-1, 2E-2, 2F-1, 2F-2, 2G-1, 2G-2 illustrate the behavior of a location coordinate and the gain in different filtering modes.

FIGS. 3A–3G plus 3J–3K illustrate, as a flow chart, another embodiment of the invention.

DESCRIPTION OF BEST MODE OF THE INVENTION

Figure 1:
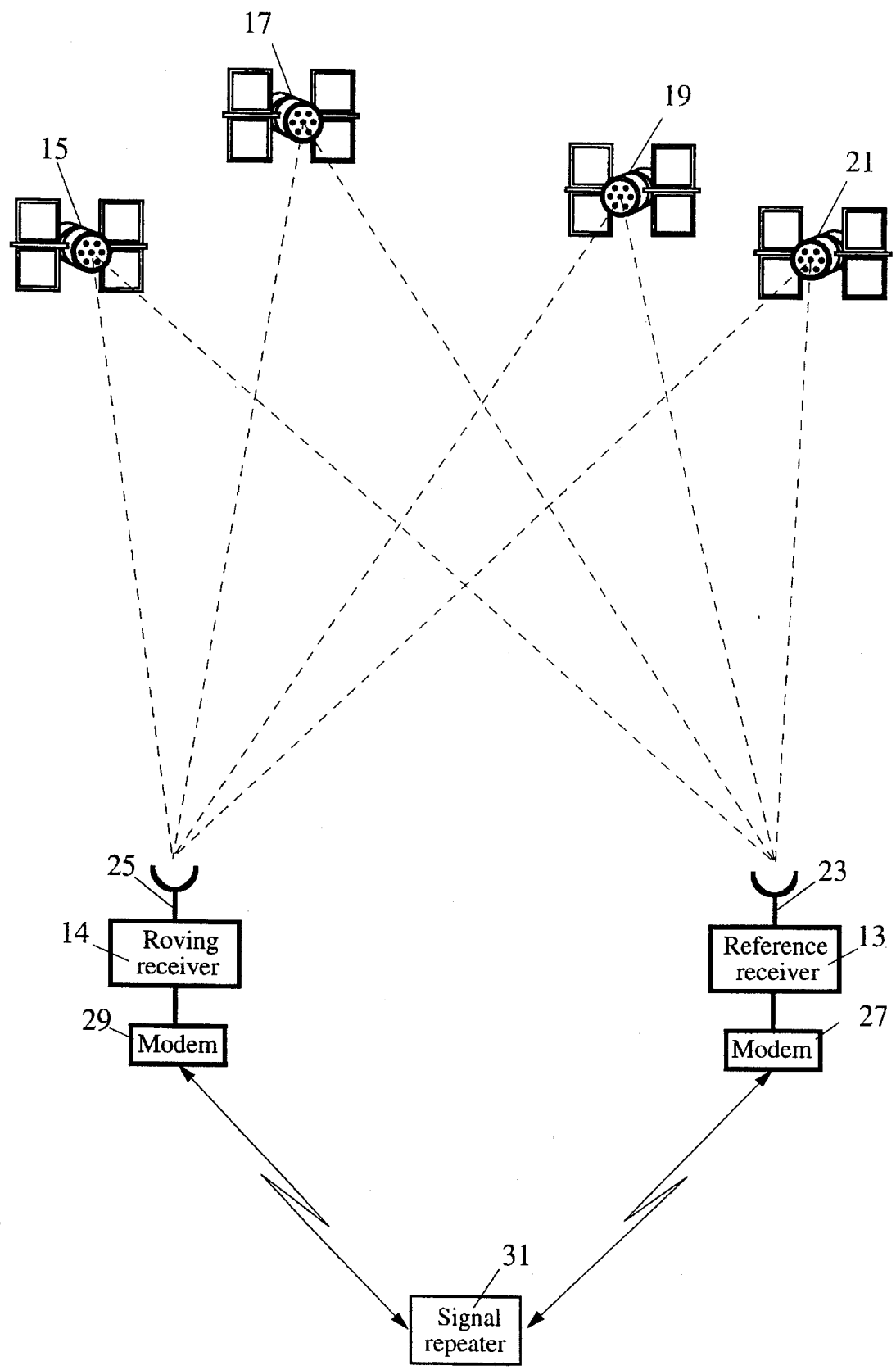
FIG. 1 is a schematic view of an SATPS system to which the invention can be applied.

FIG. 1 illustrates operation of a differential satellite positioning system ("DSATPS") in simplified form. A reference SATPS receiver and associated SATPS antenna ("reference station") 13 and a roving SATPS receiver and associated SATPS antenna ("roving station") 14 are spaced apart on or adjacent to the Earth's surface, where it is assumed that the reference receiver's location is known very accurately at any time. Presently, an SATPS signal antenna is approximately omni-directional so that SATPS signals can be received from any area of the sky, except near the horizon, without "pointing" the antenna.

An SATPS antenna receives SATPS signals from a plurality (preferably three or more) of SATPS satellites and passes these signals to an SATPS signal receiver, which (1) identifies the SATPS satellite source (satellite number or other indicia) for each SATPS signal, (2) determines the time at which each identified SATPS signal arrives at the antenna, and (3) determines the present location of the SATPS antenna from this information and from information on the ephemerides for each identified SATPS satellite. The SATPS signal antenna and signal receiver are part of the user segment of a particular SATPS, the Global Positioning System, as discussed by Tom Logsdon in *The NAVSTAR Global Positioning System*, Van Nostrand Reinhold, 1992, pp. 33–90, incorporated by reference herein.

The reference station 13 may be stationary or may be moving with location coordinates known as a function of time. Four or more SATPS satellites 15, 17, 19 and 21 transmit SATPS signals that are received by the reference and roving stations 13 and 14 and converted to present location, velocity and time on that station. The reference and roving stations 13 and 14 also include modems 27 and 29, respectively, or other communication means that provide a one-way link from the reference station 13 to the roving station 14 or a two-way link, as shown. Optionally, the system shown in FIG. 1 may also include one or more signal repeaters 31, located between the two stations 13 and 14, to facilitate long distance or non-line-of-sight communication between these two stations. Optionally, the system may include two or more roving stations. The reference station 13 may be moving or may be stationary. It is assumed that the reference station 13 is located nearby (i.e., within 250 kilometers) and that its location coordinates are known with high accuracy Lit any time so that differential satellite positioning system information is available from the reference station.

However, the DSATPS information needed for correction of the measured location of the mobile station 14 may not always be available for use by the facility that computes this location. Further, in a particular SATPS, the Global Positioning System (GPS), the U.S. Department of Defense (DoD) introduces a dithering of the GPS satellite signals, called Selective Availability or SA, from time to time, in order to make it difficult to obtain location coordinates of an SATPS antenna and receiver with high accuracy. Over a time interval of 100–300 seconds, the apparent location of an SATPS station may appear to move over in a Lissajous pattern over an oval region with characteristic diameter 30–50 meters or more, even if that station is stationary. The phrase Selective Availability or SA will refer herein to any spurious signal, introduced into SATPS signals transmitted from one or more satellites, that makes it difficult to determine the actual location of an SATPS station with reasonably high accuracy (i.e., within a few meters).

The invention begins with a sequence of three-dimensional location coordinates $\{(P_{x,n}, P_{y,n}, P_{z,n})\}_n$ (i.e., raw or measured or unfiltered values) of the SATPS station, as determined from the code phase (or carrier phase) signals received from a solution constellation of SATPS satellites (usually three or more satellites). The system also receives either code phase SATPS signals, carrier phase SATPS signals, or Doppler-shifted satellite signals, or both, that allow determination of a sequence of three-dimensional velocity coordinates $\{(V_{x,n}, V_{y,n}, V_{z,n})\}_n$ of the SATPS station. Alternatively, the particular constellation of SATPS satellites used may allow determination of only a sequence of one-dimensional or two dimensional location coordinates and/or velocity coordinates. The coordinate frame has arbitrary orientation but is preferably a Cartesian coordinate system. The position and velocity solutions are updated in three dimensions, even if the altitude is not being updated, which occurs when an insufficient number of visible satellites exists or the three-dimensional satellite geometry is poor. Given the (filtered) location coordinates $P^A_{x,n-1}$, $P^A_{y,n-1}$, and $P^A_{z,n-1}$ of the station at the last data fix time $t=t_{n-1}$, plus knowledge of the velocity coordinates $V_{x,m}$, $V_{y,m}$, and $V_{z,m}$ for $m=n-1$ and $m=n$, the predicted location coordinates $P^A_{x,n}{}^-$, $P^A_{y,n}{}^-$, and $P^A_{z,n}{}^-$ are formed relations shown below $$P^A_{x,n}{}^- = P^A_{x,n-1} + (V_{x,n}+V_{x,n-1})\,\Delta t_n/2, \quad (1)$$

$$P^A_{y,n}{}^- = P^A_{y,n-1} + (V_{y,n}+V_{y,n-1})\,\Delta t_n/2, \quad (2)$$

$$P^A_{z,n}{}^- = P^A_{z,n-1} + (V_{z,n}+V_{z,n-1})\,\Delta t_n/2, \quad (3)$$

where $\Delta t_n = t_n - t_{n-}$ is the length of the time interval between the $(n-1)$th data fix and the $n$th data fix. The location coordinates and velocity coordinates that appear on the right hand sides of Eqs. (1), (2) and (3) may also be determined by extrapolation from earlier measurements for brief periods of time when a satellite signal path is blocked.

Filtered location coordinates for the station are then formed, based upon the current raw or unfiltered location coordinate solutions $P_{x,n}$, $P_{y,n}$, and $P_{z,n}$ and the predicted location coordinates set forth in Eqs. (1), (2) and (3), viz.

$$P^A_{x,n} = \alpha_n P_{x,n} + (1-\alpha_n) P^A_{x,n}{}^-, \quad (4)$$

$$P^A_{y,n} = \alpha_n P_{y,n} + (1-\alpha_n) P^A_{y,n}{}^-, \quad (5)$$

$$P^A_{z,n} = \alpha_n P_{z,n} + (1-\alpha_n) P^A_{z,n}{}^-, \quad (6)$$

Here $\alpha_n$ is a gain factor ($0<\alpha_n \leq 1.0$) determined by the invention, based upon the SATPS situation at the time the location fix $n$ is made.

Steady State Mode

Figures 1, 2A:
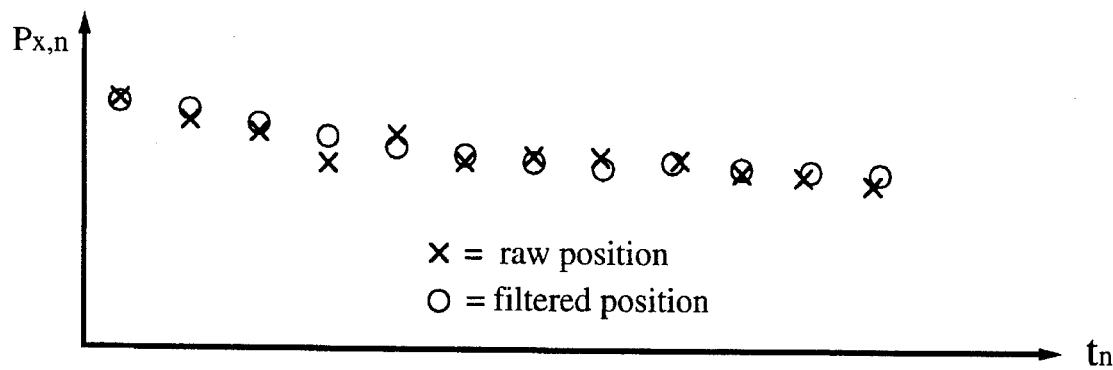
Figures 2, 2A:
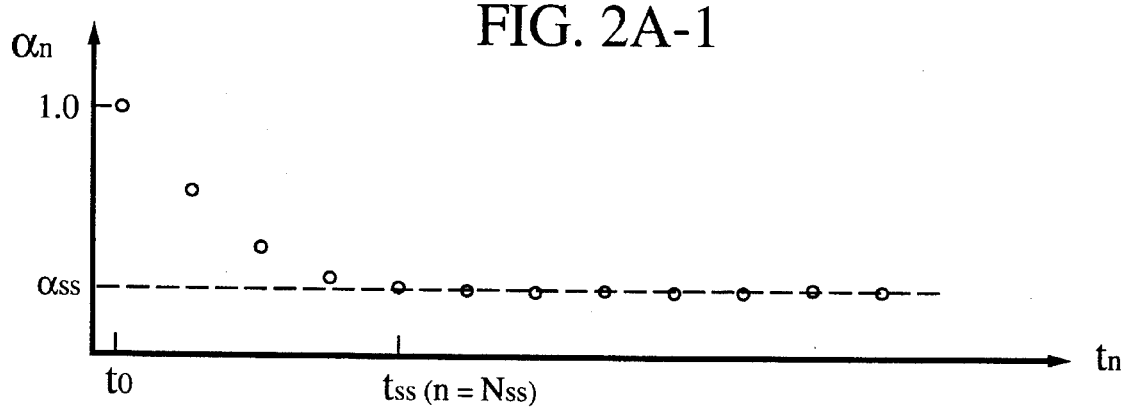

FIGS. 2A-1 and 2A-2 illustrate the behavior of a filtered location coordinate $P^A_{x,n}$ and the gain $\alpha_n$ when the system starts in a dynamic mode with (1) no change in SATPS satellite solution constellation, (2) SA is either always ON or always OFF, (3) no large change occurs between the measured and predicted location coordinates, and (4) no large time intervals occur between fixes and no significant latency error (discussed below) is present in the measurements. In FIG. 2A-2, the gain begins at $\alpha_1=1.0$ and decreases monotonically toward a steady state value $\alpha_{SS}<1$ (attained at a time $t=t_{SS}$ or at a finite integer value $n=N_{SS}$). Thus, at the first fix ($n=1$), the unfiltered location coordinates $P_{x,n}$, $P_{y,n}$ and $P_{z,n}$ completely determine the filtered location coordinates determined in Eqs. (4), (5) and (6). As the gain $\alpha_n$ decreases below 1.0, the predicted location coordinates $P^A_{x,n}{}^-$, $P^A_{y,n}{}^-$ and $P^A_{z,n}{}^-$ are weighted more heavily. The behavior of the gain $\alpha_n$ shown in FIG. 2A-2 also occurs for the system in a static mode, but the steady state value $\alpha_{SS}$(static) may differ from the dynamic mode steady state value. Notice that the filtered position trajectory $P^A_{x,n}$ in FIG. 2A-1 is nearly the same as the raw position trajectory $P_{x,n}$.

Clamping Mode

Figures 1, 2B:
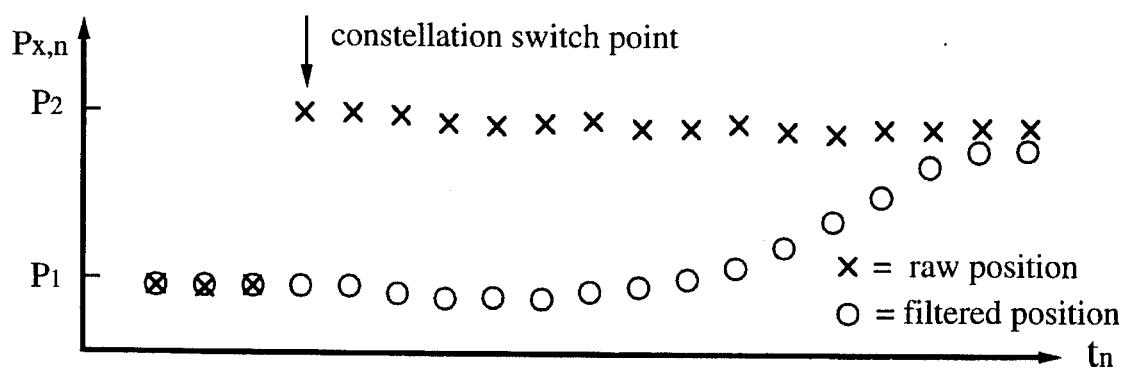
Figures 2, 2B:
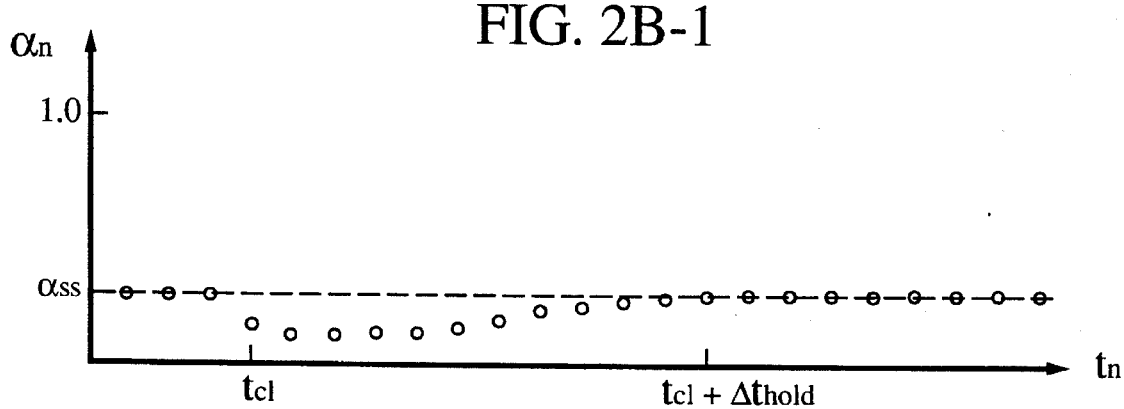

In FIGS. 2B-1 and 2B-2, the gain $\alpha_n$ has reached its steady state value $\alpha_{SS}$. However, at some time $t=t_{cl}$, the prediction error $PE_n$, defined by the relation $$PE_n = \max\{|P_{x,n} - P^A_{x,n}{}^-|, |P_{y,n} - P^A_{y,n}{}^-|, |P_{z,n} - P^A_{z,n}{}^-|\}, \quad (7)$$

which is the maximum difference between raw location coordinates and predicted location coordinates, becomes at least as large as a selected threshold value ($PE_n \geq PE_{thr}$), and the gain $\alpha_n$ is quickly decreased to, or "clamped", to a lower gain known as $\alpha_{cl}$, referred to as the clamping value, which is much smaller than $\alpha_{SS}$. At the clamping value $\alpha=\alpha_{cl}$, the new, unfiltered location coordinate values $P_{x,n}$, $P_{y,n}$, and $P_{z,n}$ contribute very little to the filtered location coordinates computed in Eqs. (4), (5) and (6). During this time the velocity solutions are used to project the filtered location coordinates $P^A_{x,n}{}^-$, $P^A_{y,n}{}^-$ and $P^A_{z,n}{}^-$, and if no unusual gaps occur in the time intervals between location fixes, this technique will provide a very accurate location trajectory with very little time lag. After a selected hold-off time interval of length $\tau_{hold}$ (which may be 0), the gain $\alpha_n$ begins to move monotonically toward the steady state value $\alpha_{SS}$ so that the unfiltered location coordinates $P_{x,n}$, $P_{y,n}$, and $P_{z,n}$ are weighted normally in the filtered location coordinates. If these unfiltered coordinates persist in time, the filtered location coordinates will then migrate toward the new unfiltered location coordinates as shown in FIG. 2B-1.

Figures 1, 2C:
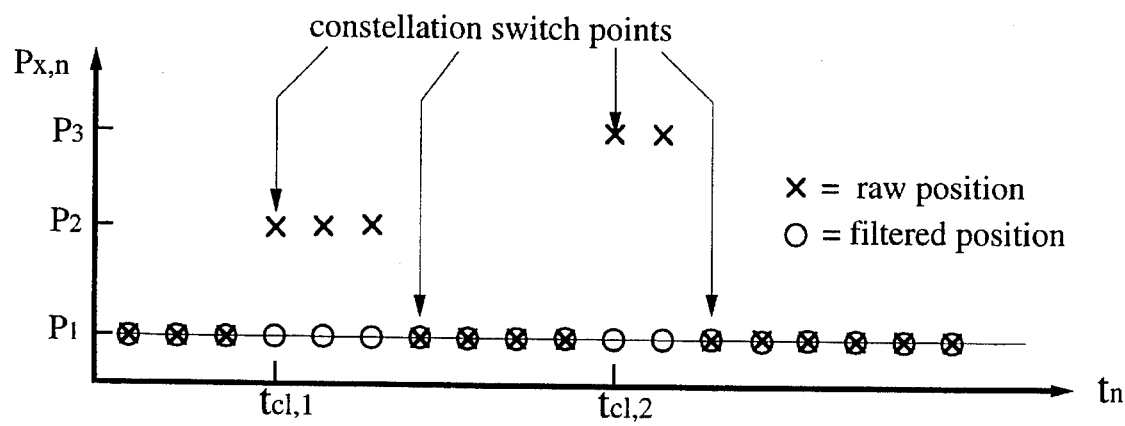
Figures 2, 2C:
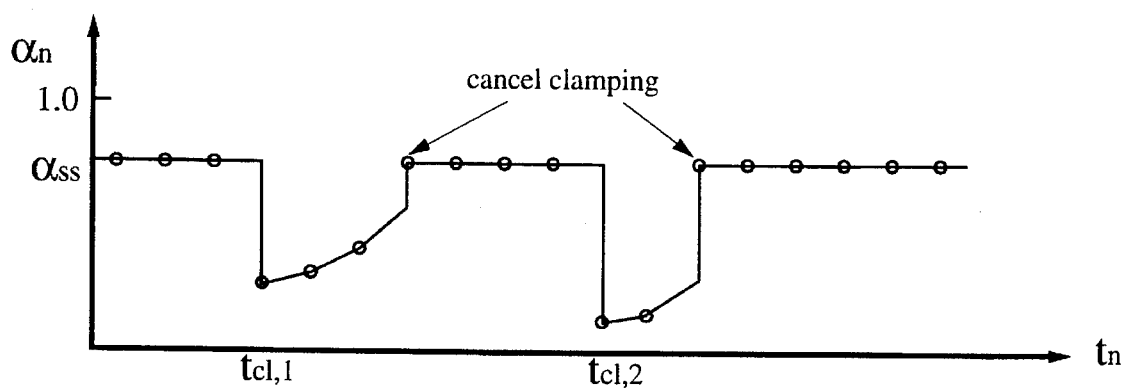

If clamping has been initiated but the solution constellation used for the location solutions quickly returns to the original constellation, as shown in FIGS. 2C-1 and 2C-2, the prediction error $PE_n$ will become small, because the holdoff prevents any migration away frown the previous location offset, and the prediction error will most likely be below the clamping threshold. In this case, the clamping mode can be cancelled, in order to return the gain $\alpha_n$ to the steady state mode value $\alpha_{SS}$, as shown in FIG. 2C-2. It is preferable to use the steady state gain as much as possible, because this provides the best weighting of the pseudorange derived (position) location solution and the Doppler derived velocity solution. A second clamping mode is shown to demonstrate that the clamping gain size is proportional to jump size. The steady state gain $\alpha_{SS}$(static) may be chosen as the ratio of the Doppler noise level to the pseudorange noise level.

Use of the clamping mode prevents a quick migration between different location offsets. The gain $\alpha_n$ is controlled so that the location will only migrate towards a new offset if that location offset persists. A location jump that is transitory will have substantially no effect on the location trajectory. There is no time lag in the filtered solution during clamping because the accurate velocity solutions are used to propagate the location solutions according to the actual dynamics of the SATPS station.

Total Expansion Mode

Figures 1, 2D:
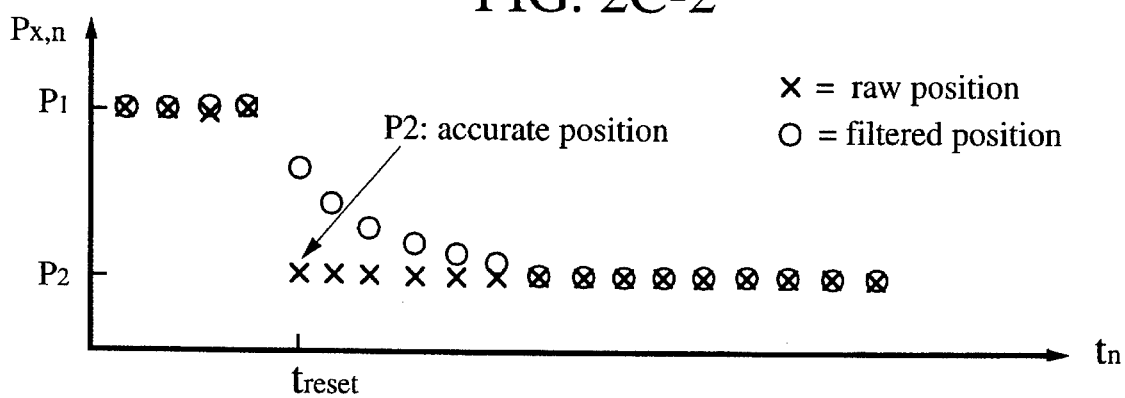
Figures 2, 2D:
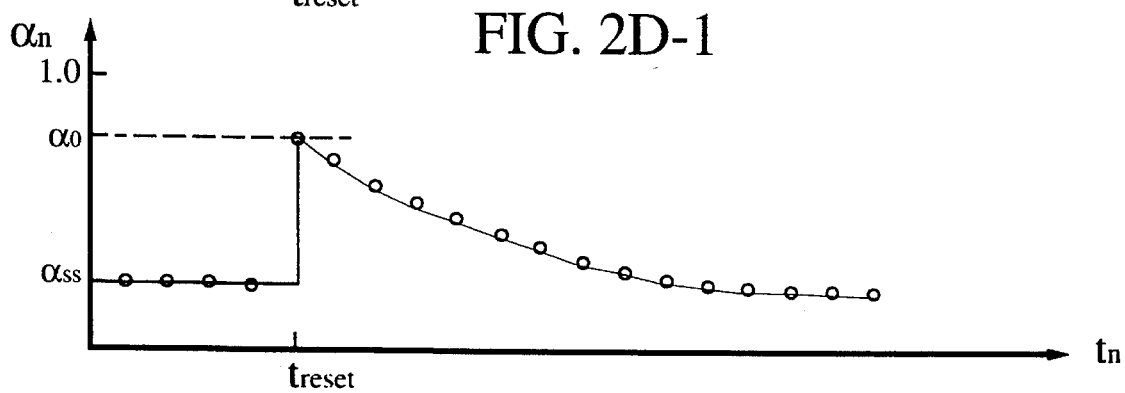

In FIGS. 2D-1 and 2D-2, the accuracy of the SATPS-determined location coordinates improves substantially at a time $t=t_{reset}$, causing a jump between the raw and filtered locations. At this time, the gain $\alpha_n$ may be reset to a selected value $\alpha_0$ ($\leq 1.0$) that may differ from, or be equal to, the initial gain value $\alpha_1=1$. This gain mode is referred to as the total expansion mode and can occur at any data fix time $t_n$, regardless of the preceding gain mode the system operated in. This improvement in accuracy might occur because (1) DSATPS information becomes available at the time $t=t_{reset}$, (2) SA is turned OFF at the time $t=t_{reset}$, (3) the location coordinate solution, which has been a two-dimensional solution, allows a three-dimensional solution beginning at the $t=t_{reset}$, or (4) for other related reasons. After the time $t=t_{reset}$, the gain $\alpha_n$ again tends monotonically toward the steady state value $\alpha_{SS}$ as shown. This feature is user selectable. Users who prefer maximum accuracy as soon as it is available will select or activate this feature. Users who prefer a smoother location trajectory with no abrupt changes will not select this feature.

Partial Expansion Mode

If the system detects that too much latency error exists in the filtered location coordinates, the system reacts by initiating a partial expansion mode. The expected latency error is computed at each step as indicated in Eqs. (8)–(11).

$$L_n = \text{latency error} = \delta V_n \Delta t_L(n)/2, \quad (8)$$

$$\text{replace } L_n \text{ by } \min(L_n, L_{thr}), \quad (9)$$

$$\delta V_n = \max\{|V_{x,n} - V_{x,n-1}|, |V_{y,n} - V_{y,n-1}|, |V_{z,n} - V_{z,n-1}|\}, \quad (10)$$

$$\Delta t_L(n) = \max\{\Delta t_n, \Delta t_m(n), \Delta t_m(n-1)\}, \quad (11)$$

where $\Delta t_n = t_n - t_{n-1}$, $\Delta t_m(n) = \max\{t_n - t_{m1}, t_n - t_{m2}, \ldots, t_n - t_{mM}\}$, where $t_{mi}$ is the time of the most recent pseudorange and Doppler shift measurements from the i-th satellite in the solution constellation with M satellites. The latency error $L_n$ is an estimate of maximum location error at time $t_n$ that may occur due to an acceleration that occurred either between data fix times or when an old measurement was being re-used in the location solutions. The estimated latency error $L_n$ is bounded above by a threshold $L_{thr}$ to limit the location jump that can occur due to this mode. If the latency error $L_n$ exceeds a selected threshold $L_{thr}$ at a time $t=t_{exp}$, the system responds by performing a "partial expansion" in which the gain $\alpha_n$ is abruptly increased to a selected partial expansion value $\alpha_n = \alpha_{exp}$, to begin to reduce this error to an acceptable magnitude after a recovery time interval of length $\Delta t_{rec}$), after which the gain $\alpha_n$ may return to a monotonic approach toward a steady state value $\alpha_{SS}$.

Figures 1, 2E:
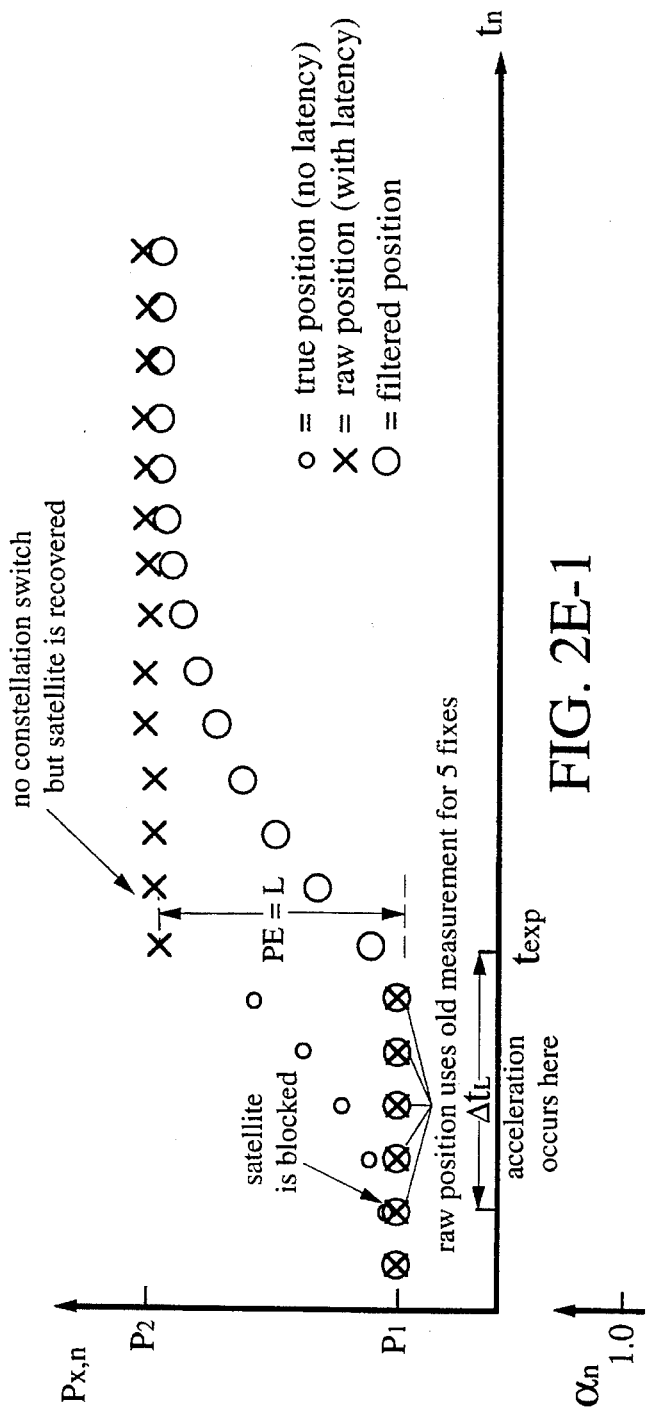
Figures 2, 2E:
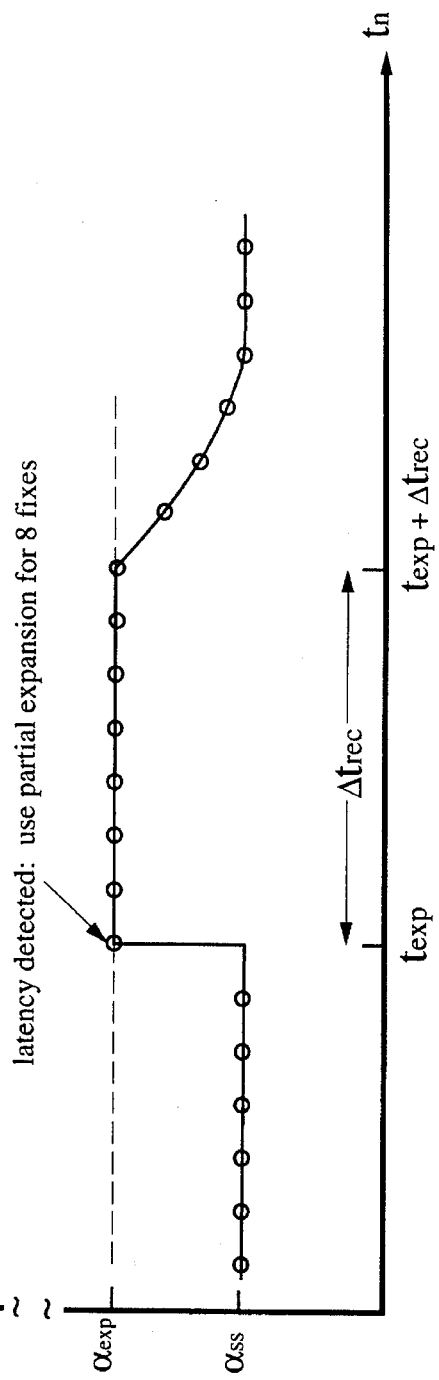

FIGS. 2E-1 and 2E-2 show the effect of using an old measurement while acceleration occurs along the line-of-sight to a given satellite, which is at a right angle to the direction of measuremnent of location coordinate shown in the figure. In this case, the raw location coordinate with the latency error undergoes no change. The true location trajectory in one dimension is shown to illustrate the divergence between the true and estimated locations. Partial expansion is activated when a new measurement is obtained from this satellite because a large change of velocity is observable between the last solution with the old measurement and the new position with no latency error. Notice that the location jump is about the same size as the observed latency error. If the location jump had been significantly larger than the expected latency error, a clamp would have occurred rather than a partial expansion.

The danger of using a larger gain $\alpha_{exp}$ during a partial expansion mode is that a large prediction error, due to a solution constellation switch would not be attenuated with this larger gain. Thus, partial expansion is initiated only if the prediction error $PE_n$ is close to the size of the expected latency error $L_n$. Bounding the estimated latency error ($L_n \leq L_{thr}$) limits the maximum location jump that can occur, because the prediction error $PE_n$ must be less than the estimated latency error times a scale factor that sets the maximum allowable jump. The size of the location jump is the prediction error tinms the expansion gain $\alpha_{exp}$.

Figures 1, 2F:
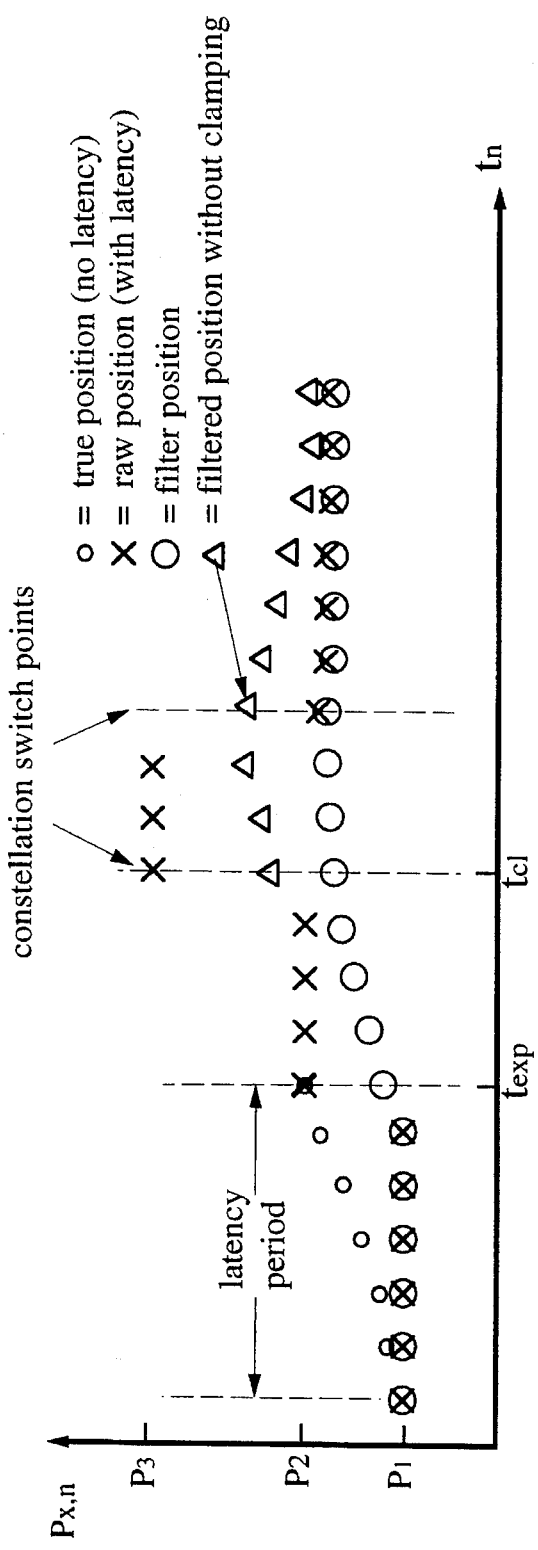
Figures 2, 2F:
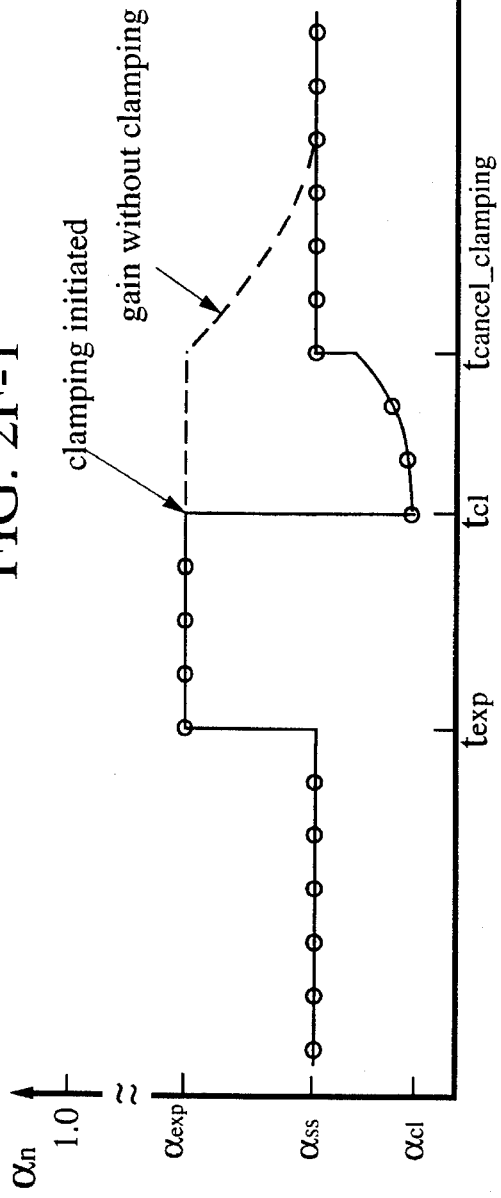

If a prediction error $PE_n$ is observed that is larger than the expected latency $L_n$, which was saved when the partial expansion mode was initiated, partial expansion is cancelled and clamping is allowed if the prediction error is large enough. This behavior is shown in FIGS. 2F-1 and 2F-2. The first part of each of FIGS. 2F-1 and 2F-2 ($t \leq t_{ci}$) is the same as in the corresponding first part of FIGS. 2E-1 and 2E-2, respectively. However, in this case asolution constellation switch occurs while the gain is in a partial expansion mode. If this mode is allowed to continue, the combination of a large gain and the large prediction error would cause the location trajectory shown in FIG. 2F-1 with the triangle symbols. Instead, the system compares the current prediction error with the saved latency error, and the system exits frown the partial expansion mode in favor of a clamping mode, to prevent the location jump, as shown in the filtered location trajectory (circular symbols).

Thus. the partial expansion mode is designed to reduce the time lag in the filtered solution when fixes have been used that result in an acceleration-induced latency error. The partial expansion mode is used only when the observed prediction error $PE_n$ is small and close in magnitude to the expected latency error $L_n$. In this way, the size of the location jumps can still be controlled while the system is in the partial expansion mode.

Static Mode

A transition from dynamic mode to static mode is initiated when the horizontal velocity magnitude $V_{h,n}$ is below a specified velocity threshold $V_{h,thr}$ for a required number of consecutive data fix times, given by req_static_count (preferably=2 or 3). The velocity threshold is a function of the estimated accuracy of the velocity solutions. If DSATPS information is available, the threshold can be lower than when DSATPS information is unavailable, for example.

When the system is in static mode, the velocity magnitude is formally set equal to zero, and it is possible to remove the wandering or dithering effects of SA on location because the location and velocity solutions become non-coherent. If DSATPS is available or SA is OFF, use of the static mode can improve the location accuracy by averaging certain errors, such as receiver noise and multipath signal errors. The predicted location when the system is in static mode is simply the last filtered location, because the velocity solution is formally set equal to zero in the static mode.

The initial gain in static mode is the inverse of a selected positive number $N_{min}$. When accurate solutions are available, $N_{min}=1$; and in worst case accuracy situations, such as when SA is ON, $N_{min}=1000$. When the static mode is initiated, the gain is set equal to $\max(1/N_{min}, \alpha_{n-1})$. The gain for subsequent fixes can be determined using $\alpha_n=1/N$ (N increments with the fix number n, from $\max(N_{min}, [1/\alpha_{n-1}]_{int})$ up to $N_{max}$. The static mode gain becomes constant when N reaches a selected positive number $N_{max}$. Each time the static mode becomes active, the same procedure is used.

Clamping can also occur in static mode, when a large location change occurs due to a solution constellation switch and the product of the current gain $\alpha_n$ times the prediction error $PE_n$ exceeds a specified threshold. In this case, the count integer N is calculated so that the resulting location change, which is the product of the prediction error and the new gain, is less than a specified threshold. The count integer N will then continue incrementing on the next fix from this new larger value, and the gain will continue to decrease until it reaches a selected minimum value.

The static mode filter gain $\alpha_n$ uses the arithmetic mean of the gains from the fixes in static mode. Thus, the filter gain should converge to the true mean if the measurement errors have zero mean and the filter is active long enough to average many cycles of the sinusoidal-like errors.

Static mode is cancelled when the horizontal velocity $V_{h,n}$ exceeds the specified threshold $V_{h,thr}$ and the change in horizontal velocity $\Delta V_{h,n}$ exceeds another selected threshold $\Delta V_{h,thr}$. Thus, the system will remain in static mode during brief excursions of the horizontal velocity magnitude above the threshold $V_{h,thr}$, if the horizontal velocity changes slowly in these periods. SA is the main contributor to horizontal velocity errors in the snapshot velocity solutions. The observed rate of change of SA dither is very small, on the order of 3 cm/sec$^2$. The threshold $\Delta V_{h,thr}$ of the change in velocity can be set at an order of magnitude larger than this amount and, as a result, a smaller velocity threshold $V_{h,thr}$ can be used on the current velocity, because the threshold does not need to be greater than the worst-case SA-induced velocity error.

The horizontal velocity magnitude $V_{h,n}$, rather than the 3-dimensional velocity magnitude, is used for all static mode checks. This allows use of a lower velocity threshold, because the horizontal velocity is less noisy than the vertical velocity (i.e., the horizontal dilution-of-precision HDOP is less than the vertical dilution-of-precision VDOP). Use of a smaller horizontal velocity threshold is preferred, to prevent very slow antenna motion from being ignored in static mode.

Exit from Static Mode

Upon exiting from static mode, the system automatically enforces a clamping mode. This is done to prevent any prediction error $PE_n$ that has built up while the system was in static mode from entering into the filtered solution too quickly as the gain changes from the small static gain $\alpha_{SS}$ (static) to the larger steady-state gain $\alpha_{SS}$ in dynamic mode. This strategy exploits the fact that any large prediction error can be absorbed with the least observability while the SATPS station is moving. The change in station location due to real motion is somewhat larger than the change of location because the filter moves to a new solution bias.

Figures 1, 2G:
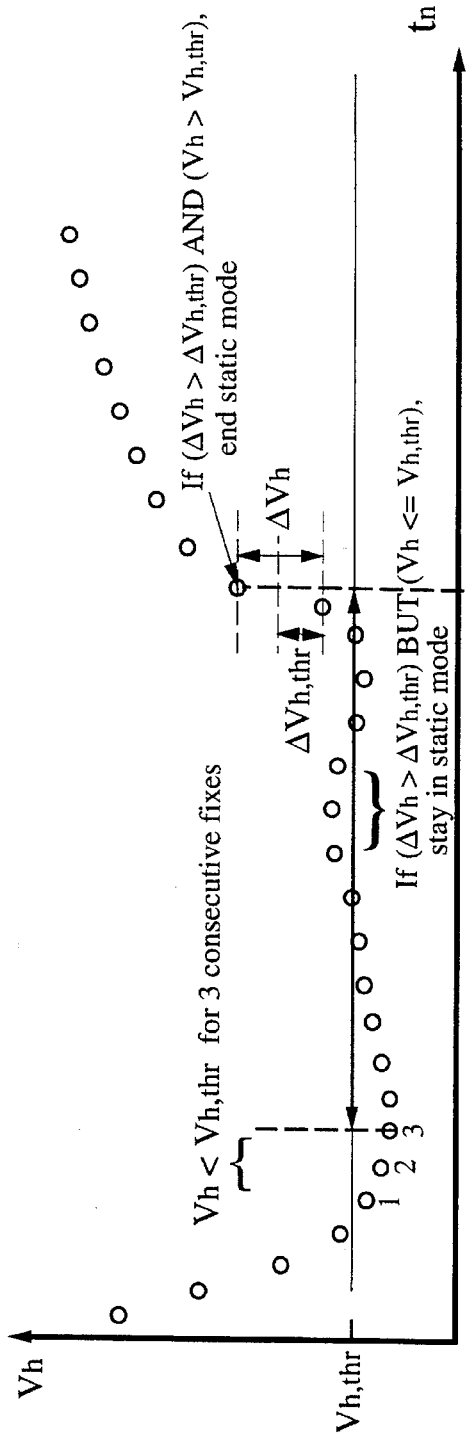
Figures 2, 2G:
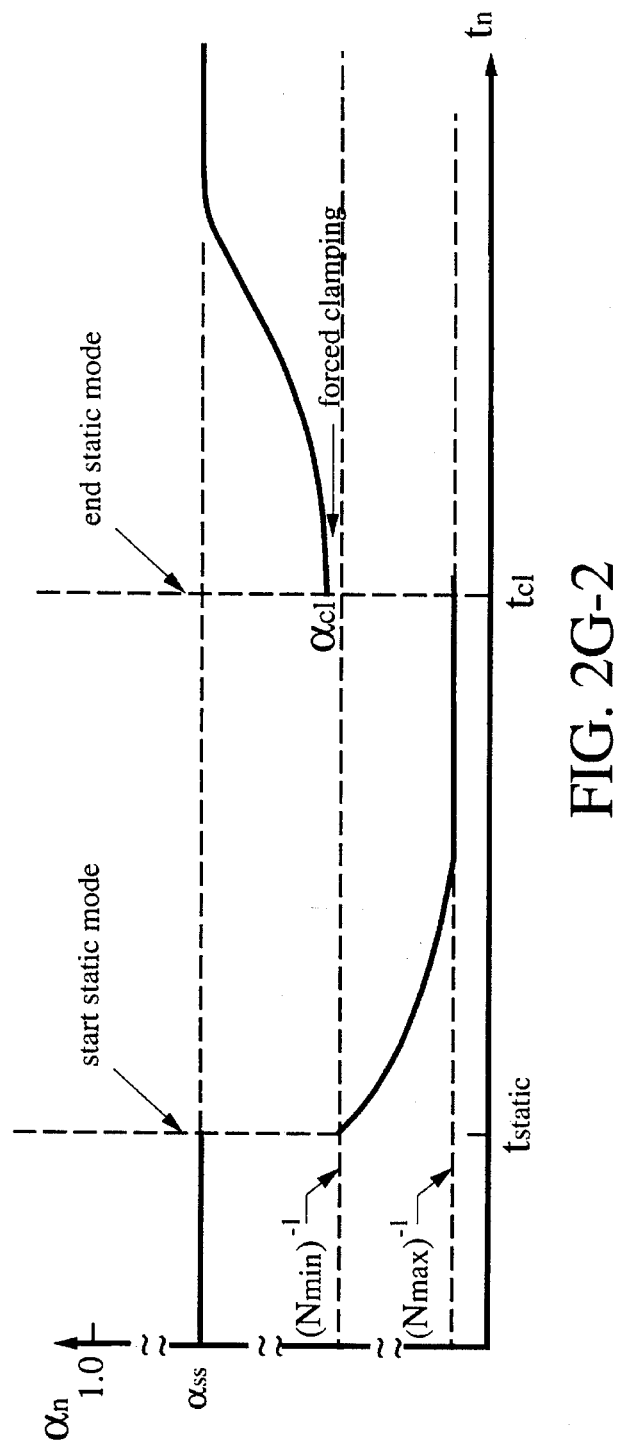

The timing relationship between the horizontal velocity magnitude and the static gain is shown in FIGS. 2G-1 and 2G-2. In this case, the static mode begins on the third location fix (at $t=t_{static}$) after the horizontal velocity magnitude falls below the threshold $V_{h,thr}$. After the static mode begins, the gain $\alpha_n$ decreases abruptly to $\alpha_n=1/N$ and thereafter decreases monotonically and is limited below by $\alpha_n \geq 1/N_{max}$. Notice that although the horizontal velocity can briefly rise above the threshold $V_{h,thr}$, if the horizontal velocity change is less than $\Delta V_{h,thr}$ at this time, and the system remains in the static mode. The static mode is cancelled and clamping is initiated when the horizontal velocity $V_{h,n}$ rises above the threshold $V_{h,thr}$ and the horizontal velocity change $\Delta V_{h,n} \geq$ a selected threshold $\Delta V_{h,thr}$. The size of the clamping gain $\alpha_{cl,n}$ will depend on the size of the prediction error $PE_n$. Even if the prediction error is small, the clamping mode is not cancelled for a specified number of steps, to ensure a smooth transition between static mode and dynamic mode.

With the combination of the clamping mode, the two expansion modes, and the steady state mode, the gain of the filter is explicitly controlled to limit and control the change in the position which is clue to migration between different position offsets. Use of the static mode allows the receiver to report that it is not moving and provide a very slowly changing position trajectory that approaches the true position in the presence of measurement errors that are time-varying but are zero-mean.

FIGS. 3A–3I collectively illustrate, in flow chart form, one embodiment of the invention. where an accompanying Glossary Of Variables Used sets forth definitions of the variables used in these Figures.

Glossary of Variables Used

N=integer used for counting consecutive fixes in static mode
$N_{min}$, $N_{max}$=minimum and maximum values of N in static mode
$(P_{x,n}, P_{y,n}, P_{z,n})$=three-dimensional location coordinates for nth fix
$(V_{x,n}, V_{y,n}, V_{z,n})$=three-dimensional velocity coordinates for nth fix
$\Delta t_n$=time coordinate at time of nth fix
$\Delta t_n = t_{n-1}$=time since preceding fix ($n \geq 2$)
$\Delta t_m(n) = \max\{t_n-t_{m1}, t_n-t_{m2}, \ldots, t_n-t_{mM}\}$, where $t_{mi}$ is the most recent time of pseudorange and Doppler measurement, using the i-th satellite in the solution constellation which uses M satellites
$\Delta t_L(n) = \max\{\Delta t_n, \Delta t_m(n), \Delta t_m(n-1)\}$=maximum latency time interval during which an acceleration could induce an error in the snapshot position and velocity solution
$\Delta t_{max}$=maximum allowed time interval during which no new fix is received
Predicted position at $t_n$ in dynamic mode using last filtered position and
average velocity:

$P^\wedge_{x,n}{}^- = P^\wedge_{x,n-1} + (V_{x,n}+V_{x,n-1}) \Delta t_n/2$
$P^\wedge_{y,n}{}^- = P^\wedge_{y,n-1} + (V_{y,n}+V_{y,n-1}) \Delta t_n/2$
$P^\wedge_{z,n}{}^- = P^\wedge_{z,n-1} + (V_{z,n}+V_{z,n-1}) \Delta t_n/2$ Predicted position at $t_n$ in static mode using last filtered position:

$P^{\wedge}_{x,n}{}^- = P^{\wedge}_{x,n-1}$
$P^{\wedge}_{y,n}{}^- = P^{\wedge}_{y,n-1}$
$P^{\wedge}_{z,n}{}^- = P^{\wedge}_{z,n-1}$ Filter position solution using new snapshot position and predicted position:

$P^{\wedge}_{x,n} = \alpha_n P_{x,n} + (1-\alpha_n)P^{\wedge}_{x,n}{}^-$ (filtered x-coordinate value)
$P^{\wedge}_{y,n} = \alpha_n P_{y,n} + (1-\alpha_n)P^{\wedge}_{y,n}{}^-$ (filtered y-coordinate value)
$P^{\wedge}_{z,n} = \alpha_n P_{z,n} + (1-\alpha_n)P^{\wedge}_{z,n}{}^-$ (filtered z-coordinate value)

$PE_n = \max\{|P_{x,n} - P^{\wedge}_{x,n}{}^-|, |P_{y,n} - P^{\wedge}_{y,n}{}^-|, |P_{z,n} - P^{\wedge}_{z,n}{}^-|\}$ = maximum difference between "raw" location coordinates and predicted filtered location coordinates $PEhd\_thr$ = threshold value for $PE_n$ at which checks for clamping and expansion occur, and also the maximum allowable position jump threshold $V_{h,n}$ = horizontal velocity at $t_n$ $\Delta V_{h,n} = |V_{h,n} - V_{h,n-1}|$ = horizontal velocity change between fixes n−1 and n $\delta V_n = \max\{|V_{x,n} - V_{x,n-1}|, |V_{y,n} - V_{y,n-1}|, |V_{z,n} - V_{z,n-1}|\}$ = maximum change in velocity in any coordinate $\alpha_n$ = gain factor used for computing filtered location coordinates for fix n $\alpha_0$ = reset value for gain $\alpha$ ($0 < \alpha_0 \leq 1$) in total expansion mode $\alpha_{SS}$ = dynamic mode steady state value of gain factor $\alpha$ $\alpha_{SS}$(static) = static mode steady state value of gain factor where $\alpha_{SS}$32 $1/N_{max}$ $\alpha_{cl,n}$ = clamping value of $\alpha_n$ (>0) at nth fix when clamping is initiated $\alpha_{min}$ = minimum value of $\alpha_n$ allowed for $\alpha_{cl,n}$ $\alpha_{exp}$ = gain used in partial expansion mode to quickly correct accumulated latency error $\beta_{cl}$ = multiplication factor for increasing $\alpha$ from $\alpha_{cl}$ toward $\alpha_{SS}$ in clamping mode ($\beta_{cl} > 1$)

$\beta_{SS}$ = multiplication factor for decreasing $\alpha$ from $\alpha_0$ toward $\alpha_{SS}$ in normal dynamic mode ($\beta_{SS} < 1$)

PDOP(n) = dilution-of-precision of three dimensional position, which describes how independent unit variance measurement errors are amplified into position errors HDOP(n) = dilution of precision of horizontal position
VDOP(n) = dilution of precision of vertical position first_fix(n) = 1 if the nth fix is the first fix after power-up (n=1), =0 otherwise first_3D_fix(n) = 1 if the nth fix is the first three-dimensional location fix, =0 otherwise clamp_active(n) > 0 if clamping is active, < 0 if partial expansion is activated, =0 in normal dynamic mode or static mode new_clamp(n) = 1 if clamping was activated at nth fix, =0 otherwise do_static(n) = 1 if static mode is activated at nth fix, =0 otherwise static_count(n) = integer counting variable for entry into static mode req_static_count = minimum value of static_count required to enter static mode; req_static_count=r13 with r13=2 preferred end_static_count(n) = countdown integer for exiting from a static mode routine which usually forces the clamping mode to remain active even if the observed prediction error is below the clamping threshold; end_static_count=r14 with r14=20−60 preferred fix_dim(n) = 2 or 3 if the dimension of the position determination at the nth fix is 2 (horizontal only) or 3 (horizontal and vertical), respectively last_fix_dim(n) = 2 or 3 if at the last fix the solution dimension was 2 or 3 new_fix_set(n) = 1 if the solution dimension changed at nth fix OR a constellation switch occurred at the nth fix, =0 otherwise static_last_fix(n) = 1 if the preceding fix at n−1 was in the static mode DSATPS = method of obtaining estimates of the non-receiver induced measurement errors to a receiver to improve accuracy, for GPS, known as differential GPS or DGPS Selective Availability (SA) = large time-varying measurement errors imposed on GPS satellites by U.S DoD acc_mode(n) = 1 if {DSATPS is present OR if SA is absent}, =0 otherwise DSATPS_ON(n) = 1 if DSATPS is presently on, =0 otherwise SA_OFF(n) = 1 if SA is presently OFF, =0 otherwise first_DSATPS_fix(n) = 1 if the DSATPS has just turned ON, =0 otherwise reset_filter(n) = 1 if gain $\alpha$ is to be reset to its maximum value $\alpha_0$, =0 otherwise B2G(n) (bad-to-good switch value) = 1 if the user desires the gain $\alpha$ is to be reset to $\alpha_0$ whenever the estimated accuracy of the position solution improves between fixes by a significant amount, =0 otherwise $A_n = \ln\{PE_{thr}/r27\alpha_{SS}PE_n\}/\ln\{1-\alpha_{SS}\}$, number of fixes it takes for the filtered position to change by an amount so that the filter will not reclamp due to the change in position offset that initiated the clamping mode; r27 a selected positive constant; r27=2 preferred $B_n = \ln\{\alpha_{SS}/\alpha_n\}/\ln\{\beta_{cl}\}$, number of fixes it takes to go from the clamping gain to the steady state gain $L_n$ = latency induced position error = $\delta V_n \Delta t_L/2$ = estimate of maximum position error that could occur due to presence acceleration when latency is present in the filtered solution last_latency = expected latency (L) saved when partial expansion mode was last initiated last_$\alpha$ = value of $\alpha$ from fix n−1 (saved)

last_hvel = horizontal velocity from the last fix = $V_{h,n-1}$, saved before static mode zeroes the total velocity last_acc_mode = acc_mode value from fix n−1 (saved)

$\sigma_{pos} = PDOP \times \sigma_{meas}$.

$\sigma_{meas} = 2-8$ if SA is absent, =16−32 if SA is present

In a first step 111 in FIG. 4A, certain system variables are initialized:

static_count=0,
$\alpha_n = \alpha_1 = 1.0$,
N=1
end_static_count=r14 (r14=20−60 preferred),
$PE_{thr}$=1 meter,
$PE_{max}$=1000 meter,
clamp_active=0,
$\Delta t_{max}$=r28 sec (r28=6 preferred),
$\alpha_{min}$=r29 (r29=0.001 preferred),
$\alpha_{SS}$=r30 (r30=0.0625 preferred),
$\alpha_{exp}$=r31 (r31=0.2 preferred),
$\beta_{SS}$=r32 (r32=0.5 preferred), where r28, r29, r30, r31 and r32 are selected positive constants. With the exception of the first three of these initialization values, these numbers can be changed, with suitable changes being made in other details of the algorithm used in the invention.

Figure 3A:
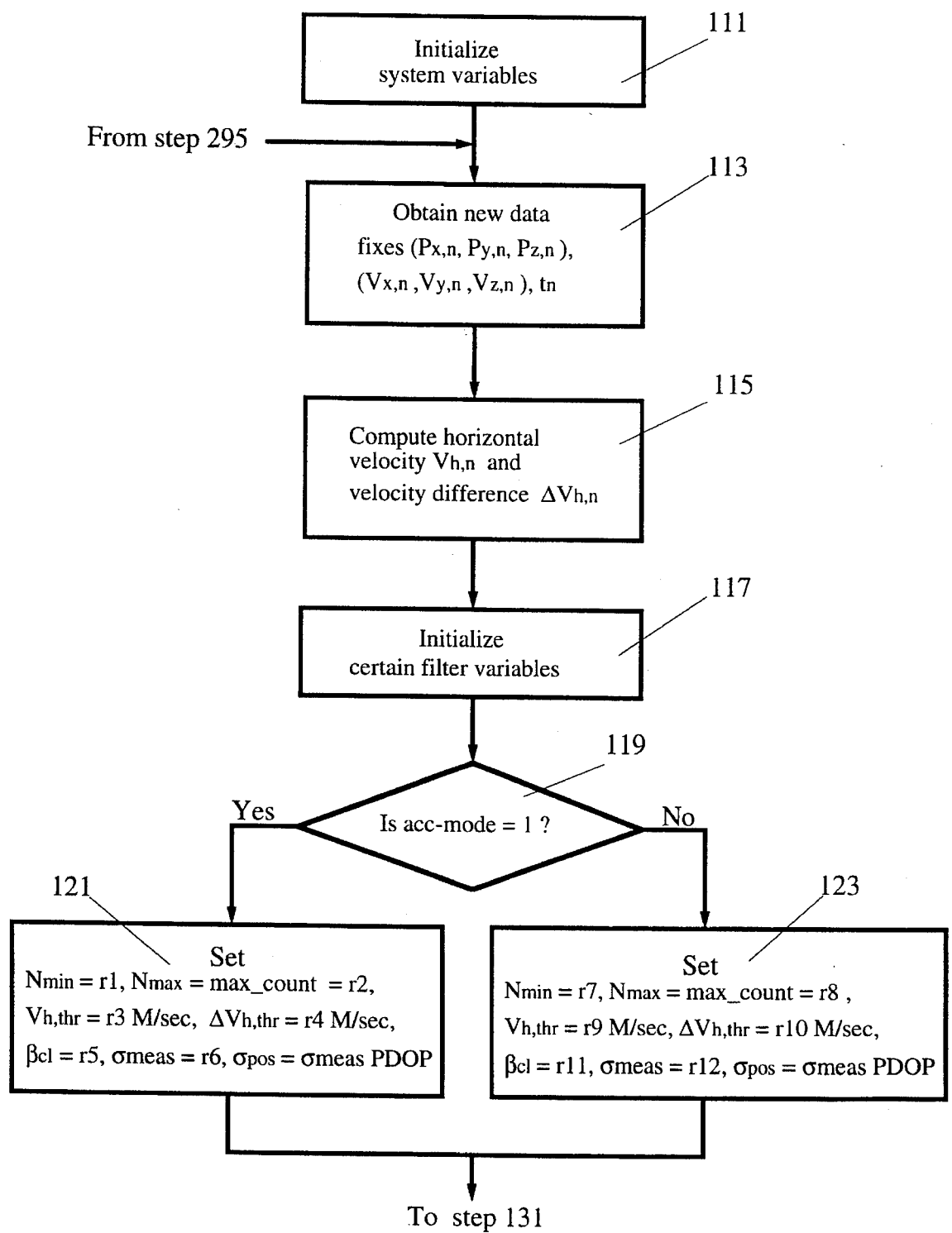
FIGS. 3A–3I illustrate, as a flow chart, one embodiment of the invention.

In step 113 of FIG. 3A, new data fixes are obtained for the position, velocity and time variables $P_{x,n}$, $P_{y,n}$, $P_{z,n}$, $V_{x,n}$, $V_{y,n}$, $V_{z,n}$, and $t_n$ for the nth fix (n=1 initially, when power-up occurs). The horizontal component of velocity $V_{h,n}$ and velocity change $\Delta V_{h,n}$, in whatever local coordinates are being used, is computed in step 115.

In step 117, certain Filter variables are set or reset for the new (or first) data values for the nth fix:

do_static(n)=0,
req_static_count=r$_0$,
fix_dim(n)=present value (2 or 3),
new_clamp(n)=0,
new_fix_set(n)=present value,
acc_mode(n)=DGPS_ON+SA_OFF=present value,
$\Delta t_m(n)$=present value,
DSATPS_ON+present value,
SA_OFF=present value,
PDOP=present value,
B2G=present value, In step 119. the system determines if acc_mode(n)=1? If the answer is yes, the system sets the following filter variable values for the nth fix in step 121:

$N_{min}$=r1 (r1=1 preferred),
$N_{max}$=r2 (r2=100 preferred),
$V_{h,thr}$=r3 m/sec (r3=0.1 preferred),
$\Delta V_{h,thr}$=r4 m/sec (r4=0.2 preferred),
$\beta_{cf}$=r5 (r5=1.5 preferred),
$\sigma_{meas}$=r6 (r6=2–8).

If the answer is no (i.e., acc-mode(n)≠1), these filter variables are given the following values for the nth fix in step 123:

$N_{min}$=r7 (r7=100 preferred),
$N_{max}$=r8 (r8=10$^6$ preferred)
$V_{h,thr}$=r9 m/sec (r9=1.1 preferred),
$\Delta V_{h,thr}$=r10 m/sec (r10=0.5 preferred),
$\beta_{cf}$=r11 (r11=1.125 preferred),
$\sigma_{meas}$=r12 (computed; r12=16–32).

Figure 3B:
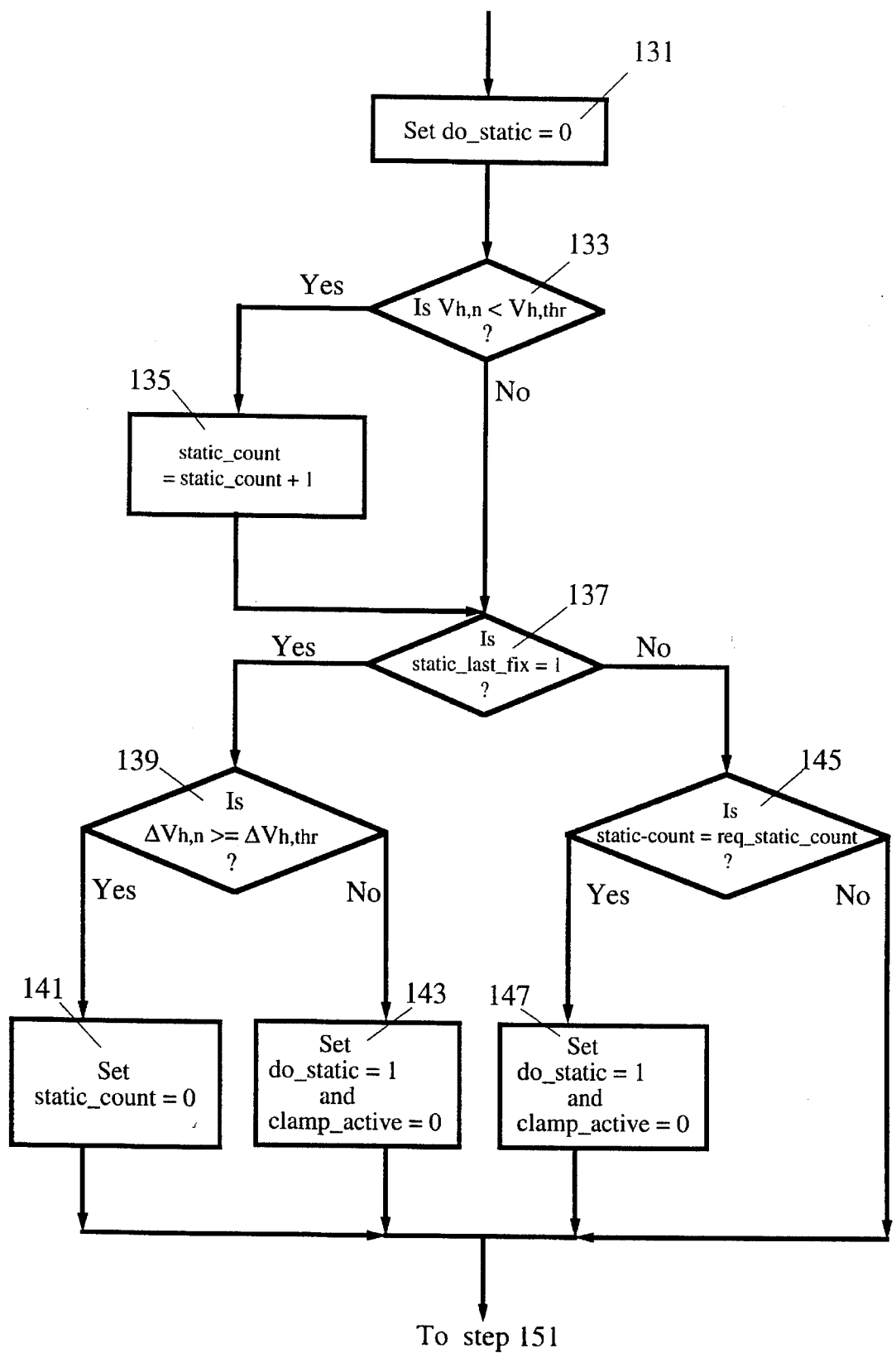

In step 131 in FIG. 3B, which follows from step 121 or step 123, the system sets do_static=0 and proceeds to step 133, where the system asks whether $V_{h,n}<V_{h,thr}$? If the answer is yes, the system sets static_count=static_count+1, in step 135, and proceeds to step 137. If the answer is no, the system proceeds directly to step 137 and inquires whether static_last_fix=1? If the answer is yes, the system proceeds to step 139 and inquires whether $\Delta V_{h,n} \geq \Delta V_{h,thr}$? If the answer to the question in step 139 is yes, the system sets static_count=0 in step 141 and proceeds to step 151. If the answer to the inquiry in step 139 is no, the system sets do_static=1 and clamp_active=0 in step 143 and proceeds to step 151. If the answer to the inquiry in step 137 is no, the system inquires in step 145 whether static_count=req_static_count =r13? Here, r13 is a selected positive constant (preferably=2). If the answer is yes, the system sets do_static=1 and clamp_active=0 in step 247 and proceeds to step 151. If the answer to the inquiry in step 145 is no, the system proceeds directly to step 151.

Figure 3C:
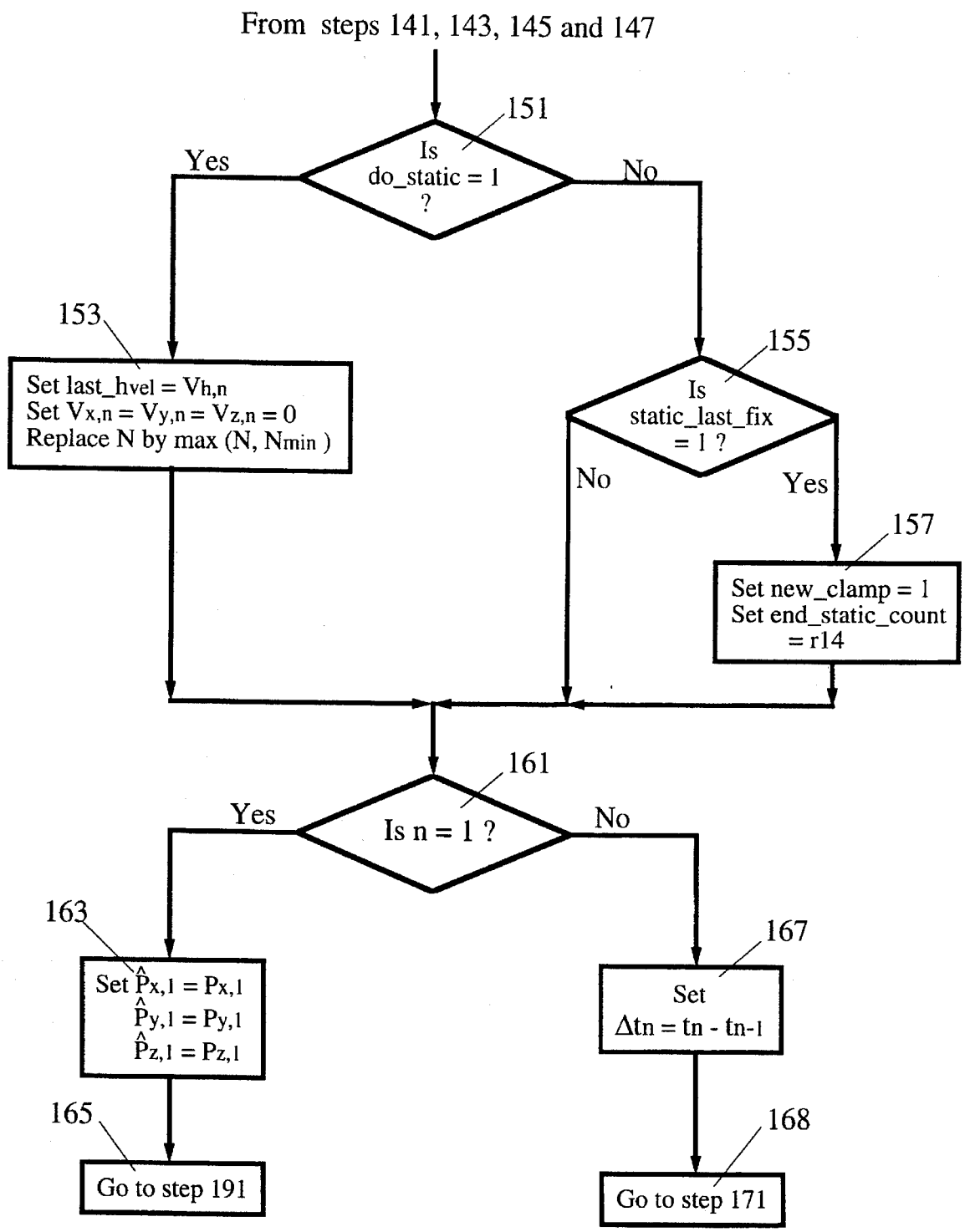

In step 151 of FIG. 3C, the system inquires whether do_static=1? If the answer is yes, the system proceeds to step 153, where it sets last_hvel=$V_{h,n}$, sets $V_{x,n}=V_{y,n}=V_{z,n}$=0, replaces N by max(N, $N_{min}$) and proceeds to step 161. If the answer is no, the system in step 155 asks whether static_last_fix=1? If the answer is yes, the system proceeds to step 157, where it sets new_clamp=1, sets end_static_count=40, and then proceeds to step 161. If the answer to the inquiry in step 155 is no, the system proceeds directly to step 161. In steps 131–157 the system determines whether it is in the static mode (do_static=1) or is in the dynamic mode (do_static=0) and makes appropriate choices for some of the other filter limit values.

In step 161, the system determines if this is the first fix after power-up (i.e., if n=1). If n=1, the system sets $P^{\Lambda}_{x,1}$=$P_{x,1}$, $P^{\Lambda}_{y,1}=P_{y,1}$, and $P^{\Lambda}_{z,1}=P_{z,1}$ in step 163 and goes to step 191. If n≥2, the system computes $\Delta t_n=t_n-t_{n-1}$ in step 167 and proceeds to step 171.

Figure 3D:
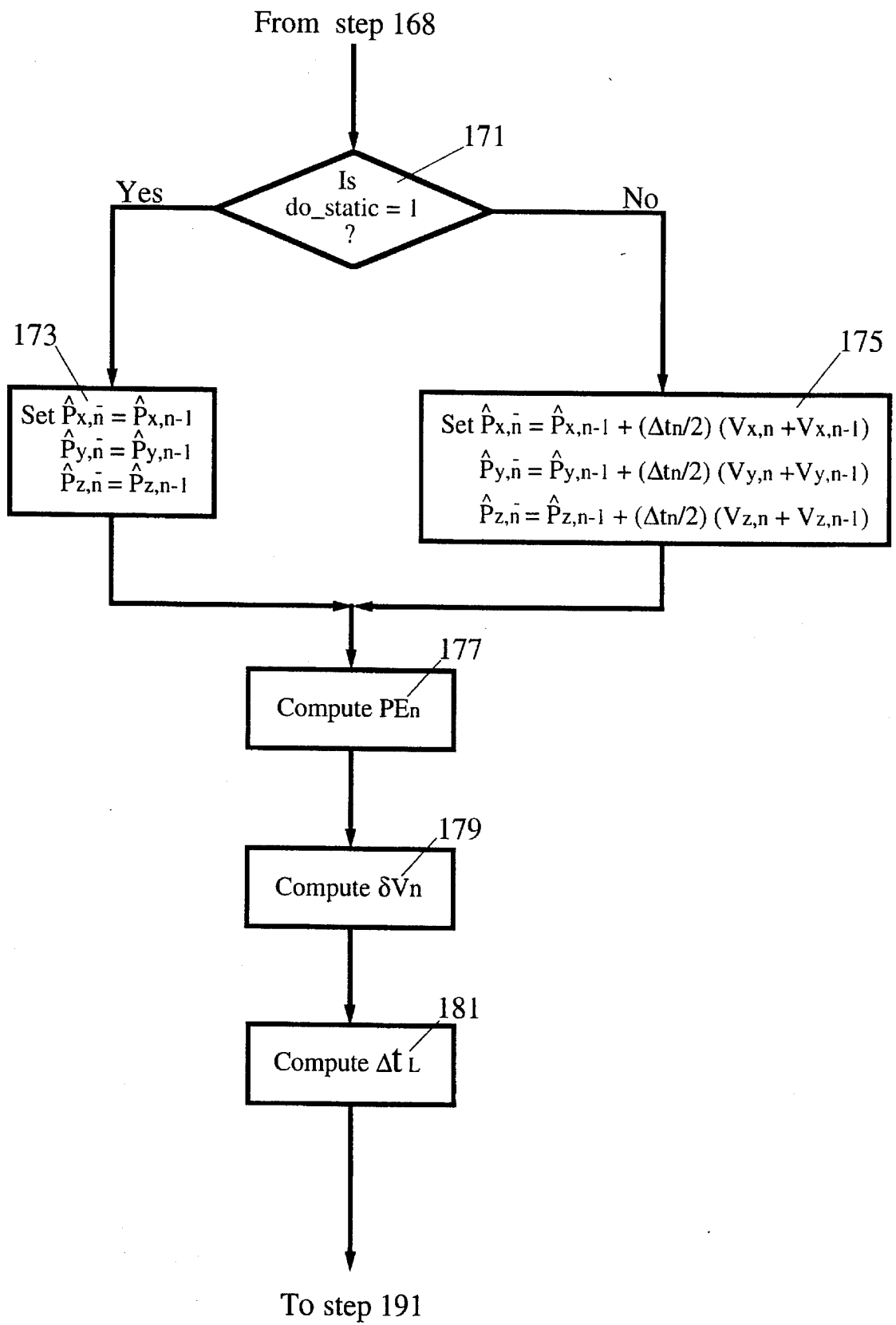

In step 171 of FIG. 3D (with n≥2), the system inquires whether do_static=1? If the answer is yes, the system sets $P^{\Lambda}_{x,n}{}^-=P^{\Lambda}_{x,n-1}$, $P^{\Lambda}_{y,n}{}^-=P^{\Lambda}_{y,n-1}$ and $P^{\Lambda}_{z,n}{}^-=P^{\Lambda}_{z,n-1}(V_{x,n}=V_{y,n}=V_{z,n}=0)$ in step 173 so that the location coordinates of the preceding location fix (n–1) become the predicted location coordinates for the present fix. The system then proceeds from step 173 to step 177. If the answer to the inquiry in step 171 is no (static mode not present at nth fix), the system applies the general expressions for the predicted location coordinates at the nth fix in step 175 and sets $$P^{\Lambda}_{x,n}{}^-=P^{\Lambda}_{x,n-1}+(V_{x,n-1}+V_{x,n}) \Delta t_n/2, \quad (1)$$

$$P^{\Lambda}_{y,n}{}^-=P^{\Lambda}_{y,n-1}+(V_{y,n-1}+V_{y,n}) \Delta t_n/2, \quad (2)$$

$$P^{\Lambda}_{z,n}{}^-=P^{\Lambda}_{z,n-1}+(V_{z,n-1}+V_{z,n}) \Delta t_n/2. \quad (3)$$

The system then proceeds from step 175 to step 177.

In steps 177, 179 and 181, the system computes the respective quantities $$PE_n=\max\{|P_{x,n}-P^{\Lambda}_{x,n}{}^-|, |P_{y,n}-P^{\Lambda}_{y,n}{}^-|, |P_{z,n}-P^{\Lambda}_{z,n}{}^-|\}, \quad (7)$$

$$\delta V_n=\max\{|V_{x,n}-V_{x,n-1}|, |V_{y,n}-V_{y,n-1}|, |V_{z,n}-V_{z,n-1}|\}, \quad (12)$$

$$\Delta t_L(n)=\max\{\Delta t_n, \Delta t_m(n), \Delta t_m(n-1)\}. \quad (13)$$

In steps 161–181, the system determines the predicted location coordinates, monitors the (maximum) change in location difference $PE_n$ and in velocity coordinates $\delta V_n$, and determines the latency time $\Delta t_L(n)=\max\{\Delta t_n, \Delta t_m(n), \Delta t_m(n-1)\}$, which is the maximum age of a measurement used in the nth fix, or in the (n–1)th fix, relative to the time of the nth fix or (n–1)th fix.

Figure 3E:
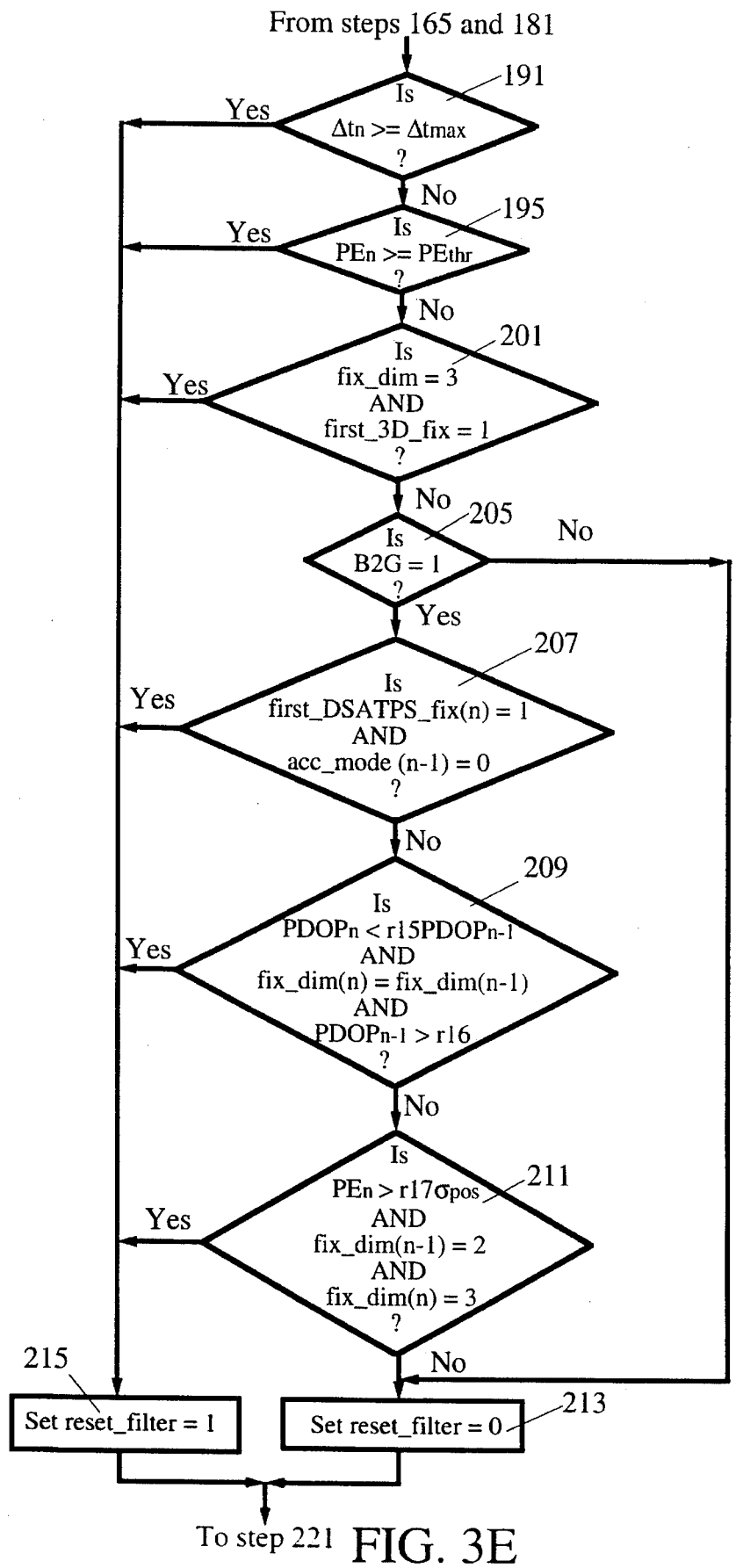

In step 191 of FIG. 3E, the system inquires whether the time between fixes $\Delta t_n \geq \Delta t_{max}$; $\Delta t_{max}$ is the maximum time allowed for a lapse in location fixes using one or more of the satellites in the solution constellation. If the answer is yes, the system sets reset_filter=1 in step 215, which resets the gain to its reset initial value $\alpha_0$, and proceeds to step 221. If the answer to the inquiry in step 191 is no, the system proceeds to step 195 and asks whether $PE_n \geq PE_{thr}$? If the answer is yes, the system sets reset_filter=1 in step 215 and proceeds to step 221. If the answer to the inquiry in step 195 is no, the system proceeds to step 201 and asks whether (fix_dim=3) AND (first_3D_fix=1) are both true? If the answer is yes, the system proceeds to step 215, sets reset_filter=1 and proceeds to step 221. If the answer to the inquiry in step 201 is no, the system proceeds to step 205.

In step 205, the system inquires whether a switch B2G has the value 1 or the value 0. If B2G=1, the system will reset the gain $\alpha$ to the reset initial value $\alpha_0$ in step 215 if any of three compound logical conditions is met in steps 207, 209 and 211: (1) if {(first_DSATPS_fix=1) AND (acc_mode(n–1)=0)}; OR (2) {(PDOP(n)<r15 PDOP(n–1)) AND (PDOP(n–1)>r16) AND (fix_dim(n)=fix_dim(n–1))}; OR (3){(fix_dim(n)=3) AND (fix_dim(n–1)=2) AND (PE$_n$>r17$\sigma_{pos}$)}. Here, r15, r16 and r17 are selected positive constants, with r15=2, r16=6 and r17=6 preferred. If none of these three compound logical conditions is met, then reset_filter is set equal to 0 in step 213, and the present value of gain $\alpha$ is not reset to a reset initial value. In either event, the system sets reset_filter=0 in step 213 and proceeds to step 221. If B2G=0, the system proceeds to step 213.

In steps 191–211, the system determines whether or not a "total expansion" occurs, where the gain $\alpha$ is re-initialized to a selected reset initial value $\alpha_0$ ($\leq 1$).

Figure 3F:
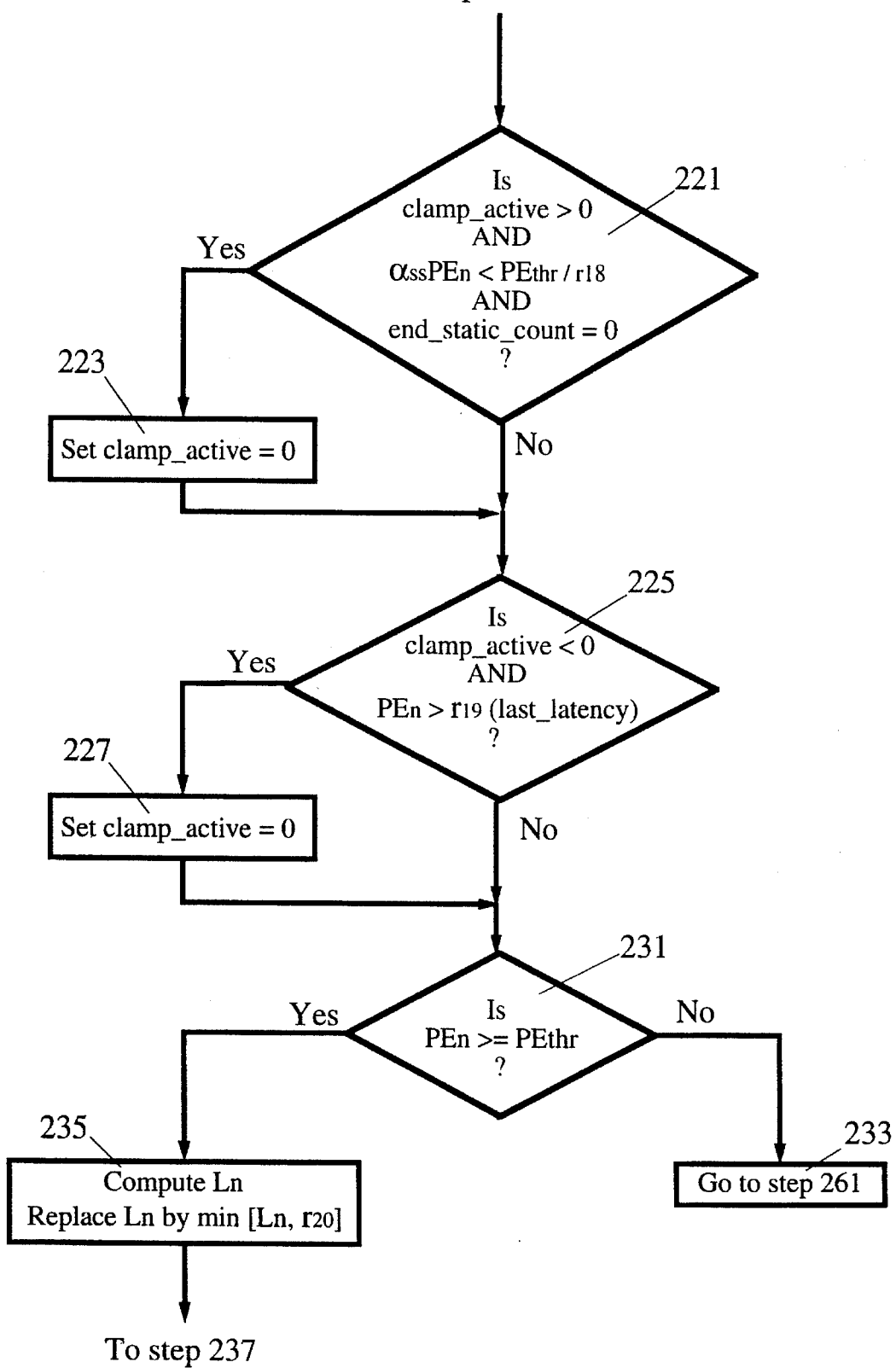
Figure 3G:
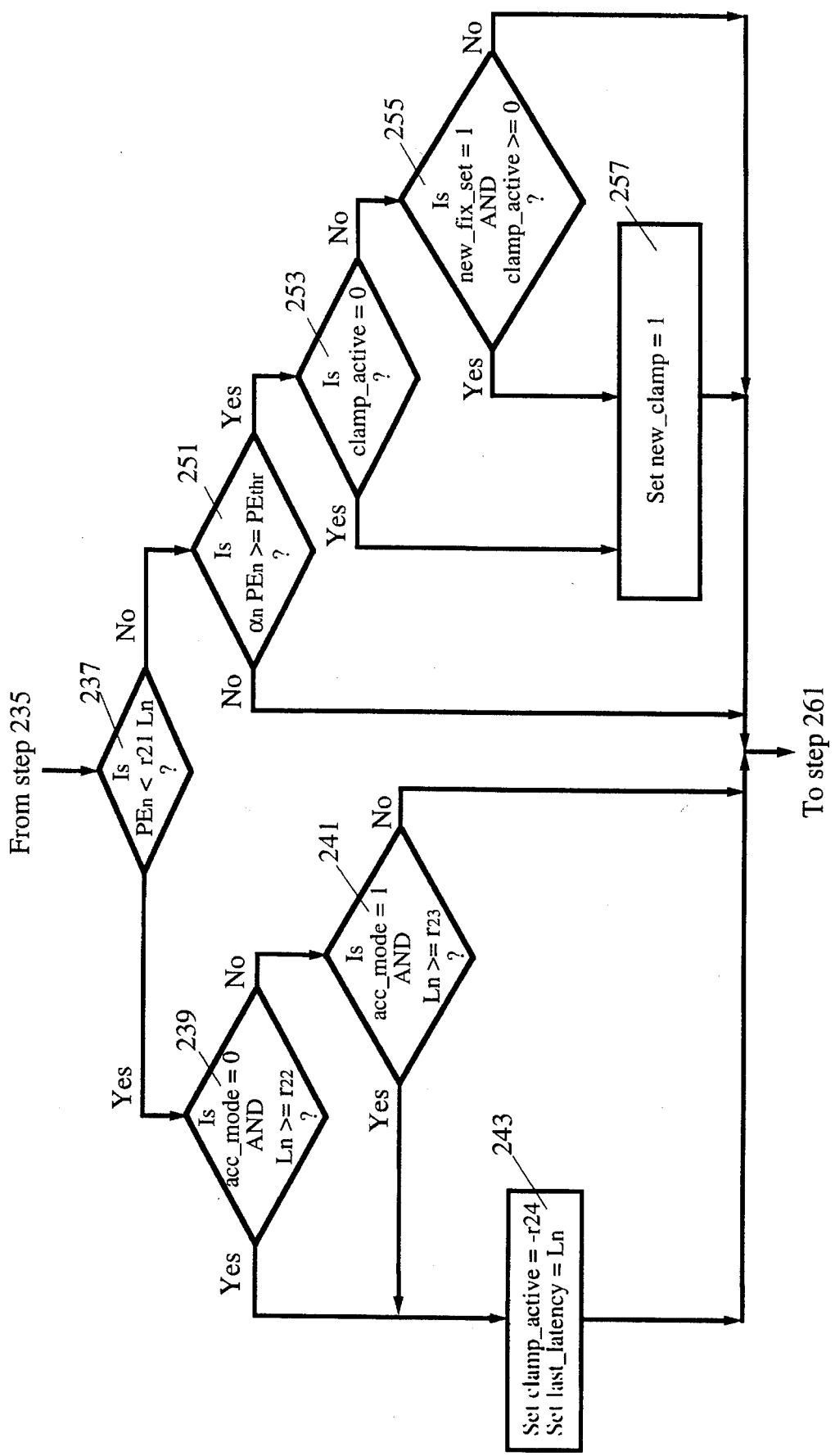

In step 221 in FIG. 3F, the system inquires whether another compound logical statement is true: Is (clamp_active>0) AND ($\alpha_{SS}$ PE$_n$<PE$_{thr}$/r18) AND (end_static_count=0)? Here, r18 is a selected positive constant, with r18=2 preferred. If the answer is yes, the system sets clamp_active=0 in step 223 and proceeds to step 225. If the answer is no, the system proceeds to step 225. In step 225, the system asks whether (clamp_active<0) AND (PE$_n$>r19(last_latency))? Here, r19 is a selected positive constant, with r19=2 preferred. If the answer is yes, the system sets clamp_active=0 in step 227 and proceeds to step 231. If the answer is no, the system proceeds to step 231.

In step 231, the system inquires whether PE$_n \geq$ PE$_{thr}$? If the answer is no, the system proceeds to step 261, which is discussed below. If the answer is yes, the system computes the new latency value $$L_n = \text{latency} = \delta V_n \Delta t_L(n)/2$$

in step 235 and replaces latency $L_n$ by min($L_n$, r20) for later computations and proceeds to step 237. Here, r20 is a selected positive constant, with r20=30 meters preferred.

The system then asks whether PE$_n \leq$ r21 $L_n$ in step 237? If the answer is yes, the system proceeds to step 239, where the system inquires whether the following compound logical statement is true: Is (acc_mode=1) AND ($L_n \geq$ r22) true (step 239) or is (acc_mode=0) AND ($L_n \geq$ r23) (step 241)? If the statement in step 239 is true or the statement in step 241 is true (or both), the system proceeds to step 243, sets clamp_active=r24, sets last_latency=$L_n$, and proceeds to step 261. If the statements in steps 239 and 241 are both untrue, the system proceeds directly to step 261. Here, r21, r22, r23 and r24 are selected positive constants, with r21=2, r22=8, r23=16 and r24=8 preferred.

If the answer to the inquiry in step 237 is no, the system proceeds to step 251, where the system inquires whether $\alpha_n$ PE$_n \geq$ PE$_{thr}$? If the answer is yes, the system proceeds to step 253 and determines whether the following compound logical statement is true: Is {clamp_active=0} (step 253) OR {(new_fix_set=1) AND (clamp_active$\geq$0)} (step 255)? If either of these statements is true, the system sets new_clamp=1 in step 257 and proceeds to step 261. If both of the statements in steps 253 and 255 are untrue, or if $\alpha_n$PE$_n$<PE$_{thr}$ (step 251), the system proceeds to step 261.

In step 261 in FIG. 3H, the system asks whether reset_filter=1, indicating that the gain $\alpha$ is to be reset? If the answer is yes, the system sets $\alpha_n$=$\alpha$(reset_value), sets clamp_active=0, sets end_static_count=0, sets N =N$_{min}$ in step 263, and proceeds to step 291, which is discussed below. If the answer is no, the system inquires whether new_clamp=1 in step 265? If the answer to the inquiry in step 265 is yes, the system asks whether do_static=1 in step 267? If the answer to the inquiry in step 267 is yes, the system sets N =[r25 PE$_n$]$_{int}$, replaces N by min(N, N$_{max}$), sets $\alpha_n$=1/N, sets clamp_active=0, in step 269, and proceeds to step 291. Here, [w]$_{int}$ denotes the integer part of the real number w and r25 is a selected positive constant, with r25=16 preferred.

If the answer to the inquiry in step 267 is no, the system sets $\alpha_{cl,n}$=PE$_{thr}$/r26 PE$_n$, where r26 is a selected number satisfying 1$\leq$r26$\leq$100, replaces $\alpha_{cl,n}$ by max($\alpha_{cl,n}$, $\alpha_{min}$), sets clamp_active=[A$_n$+B$_n$]$_{int}$, in step 271, and proceeds to step 291. Here, one choice of the parameters A$_n$ and B$_n$ is $$A_n = \ln\{PE_{thr}/r27\alpha_{SS}PE_n\}/\ln\{1-\alpha_{SS}\}, \quad (14)$$

$$B_n = \ln\{\alpha_{SS}/\alpha_n\}/\ln\{\beta_{cl}\}, \quad (15)$$

where r27 is a selected positive constant, with r27=2 preferred. Other choices of the initial value of clamp_active in step 271 can be made, such as a selected positive integer.

Figure 3H:
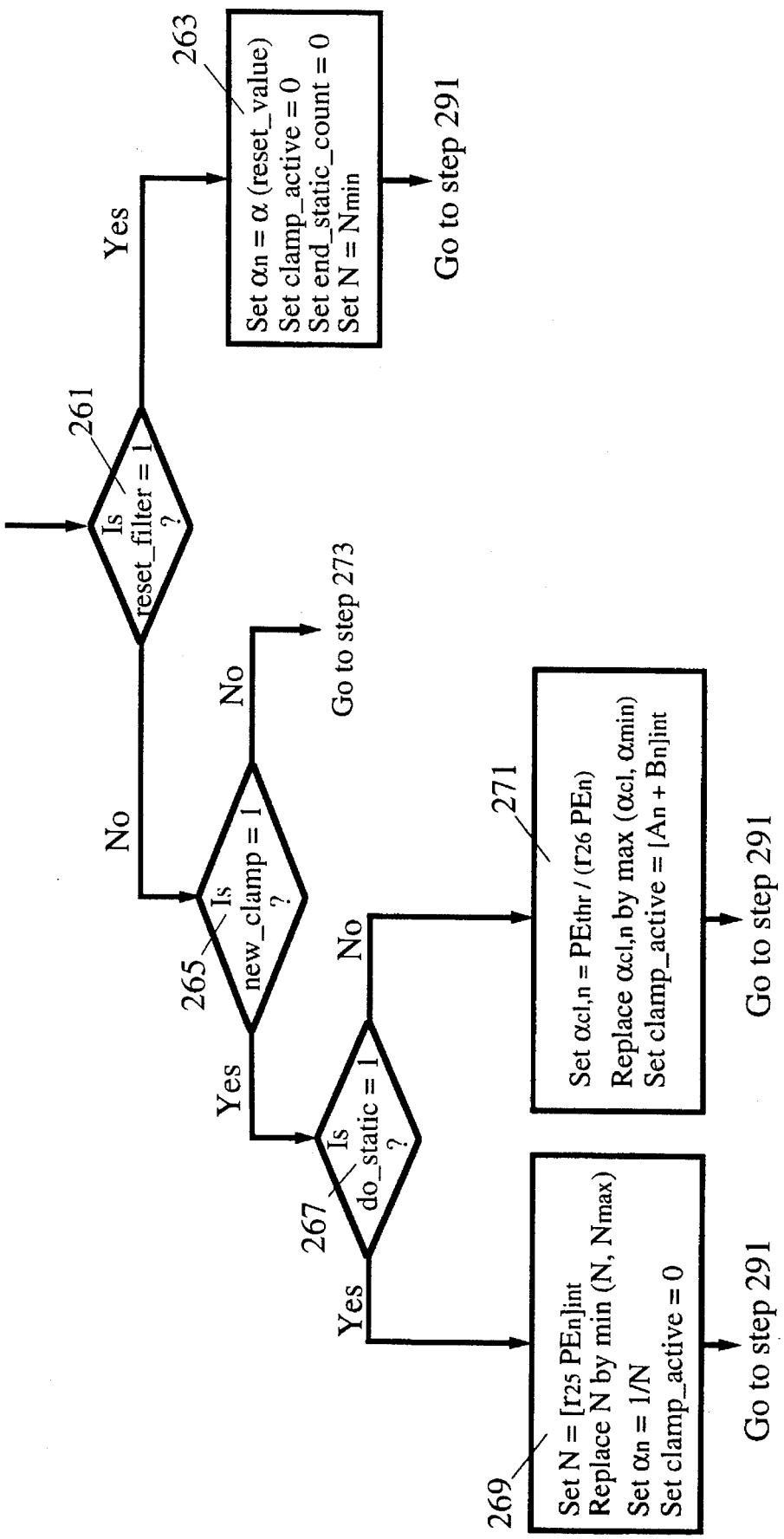
Figure 3I:
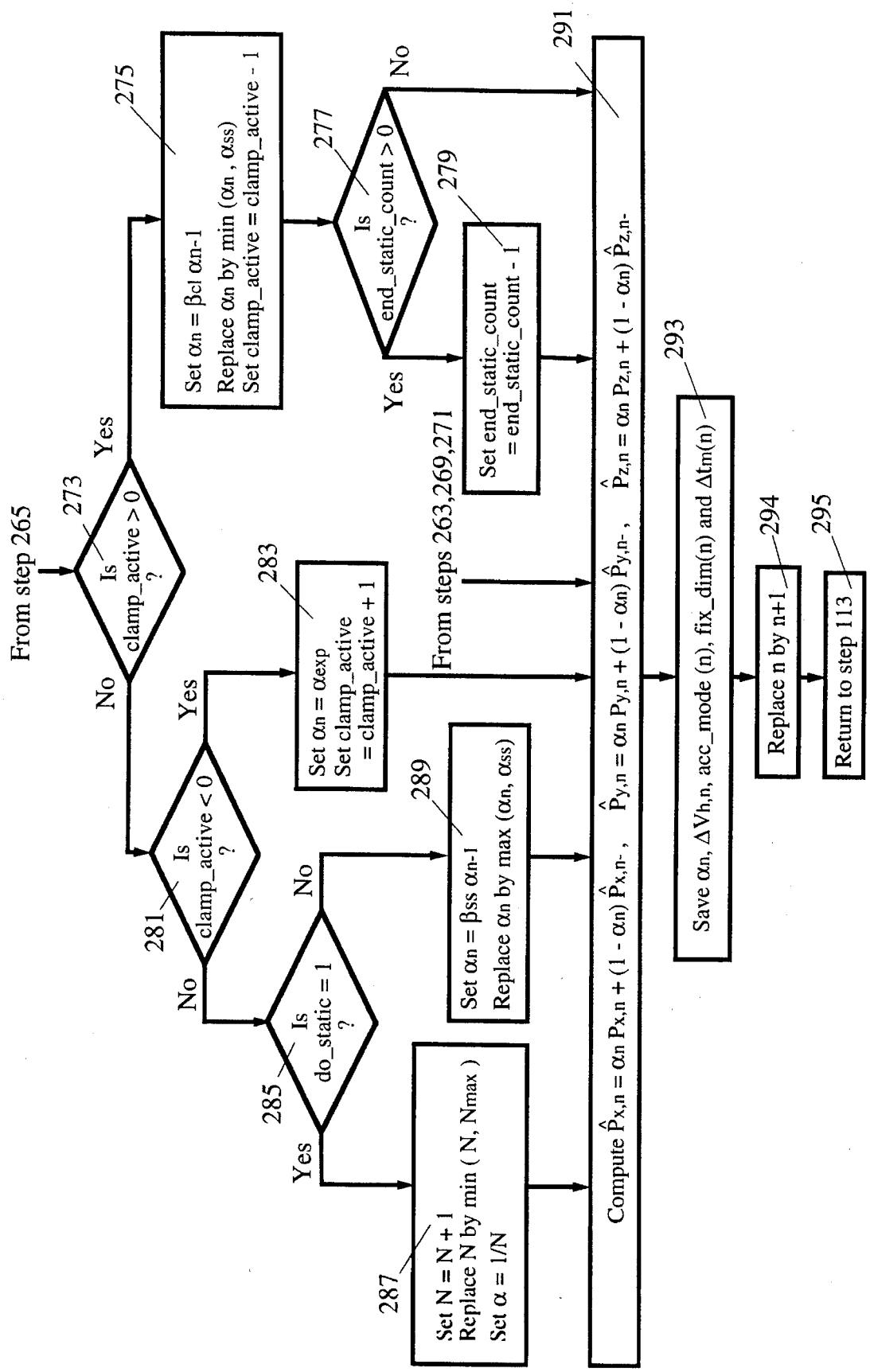

If the answer to the inquiry in step 265 is no, the system proceeds to step 273 in FIG. 3I, where it asks whether clamp_active>0? If the answer to this inquiry is yes, the system sets $\alpha_n$=$\beta_{cl}\alpha_{n-1}$, replaces $\alpha_n$ by min($\alpha_n$, $\alpha_{SS}$), sets clamp_active=clamp_active-1, in step 275, and proceeds to step 277. In step 277, the system inquires whether end_static_count>0? If the answer to the inquiry in step 277 is yes, the system sets end_static_count=end_static_count-1, in step 279, and proceeds directly to step 291. If the answer to the inquiry in step 277 is no, the system proceeds to step 291. If the answer to the inquiry in step 273 is no, the system asks whether clamp_active <0, in step 281? If the answer to the inquiry in step 281 is yes, the system sets $\alpha_n$=$\alpha_{exp}$, sets clamp_active=clamp_active+1, in step 281, and proceeds to step 291. If the answer to the inquiry in step 281 is no, the system inquires whether do_static=1, in step 285? If the answer to the inquiry in step 285 is yes, the system sets N=N+1, replaces N by min(N, N$_{max}$), sets $\alpha_n$=1/N, in step 287, and proceeds to step 291. If the answer to the inquiry in step 285 is no, the system sets $\alpha_n$=$\beta_{SS}\alpha_{n-1}$, replaces $\alpha_n$ by max($\alpha_n$, $\alpha_{SS}$), in step 289, and proceeds to step 291.

In step 291 the system computes the filtered location coordinates P$^\Lambda_{x,n}$, P$^\Lambda_{y,n}$ and P$^\Lambda_{z,n}$ by Eqs. (4)–(6) and proceeds to step 293 In step 293, the system saves last_$\alpha$= $\alpha_n$, saves last_vhdiff(n+1)=$\Delta V_{h,n}$, saves last_acc_mode(n+1)=acc_mode(n), saves last_fix_dim(n+1)=fix_dim(n), saves last_$\Delta t_m$(n+1)=$\Delta t_m$(n) and returns to step 113 through step 295. In step 294, n is replaced by n+1.

Figure 3J:
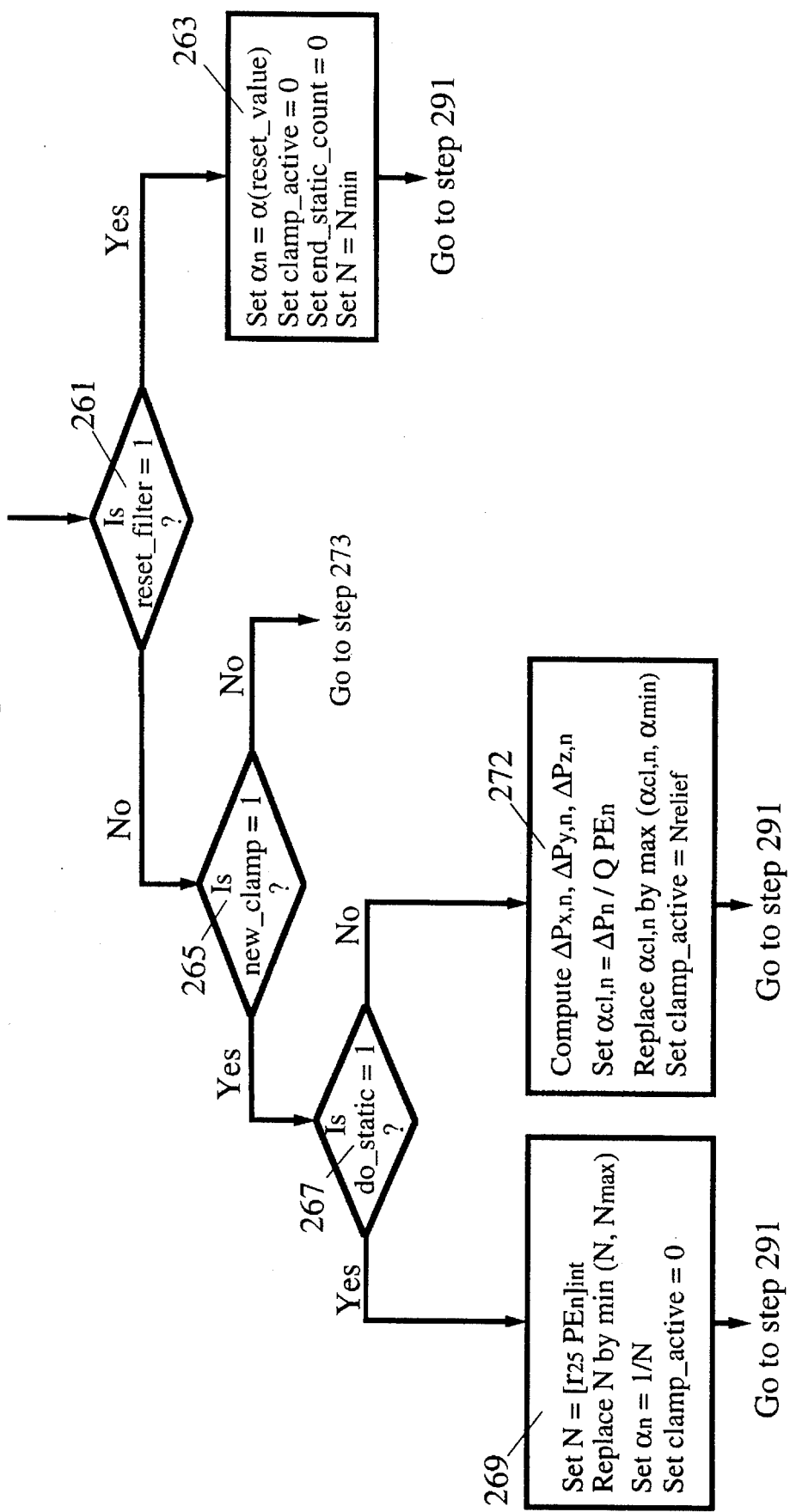
Figure 3K:
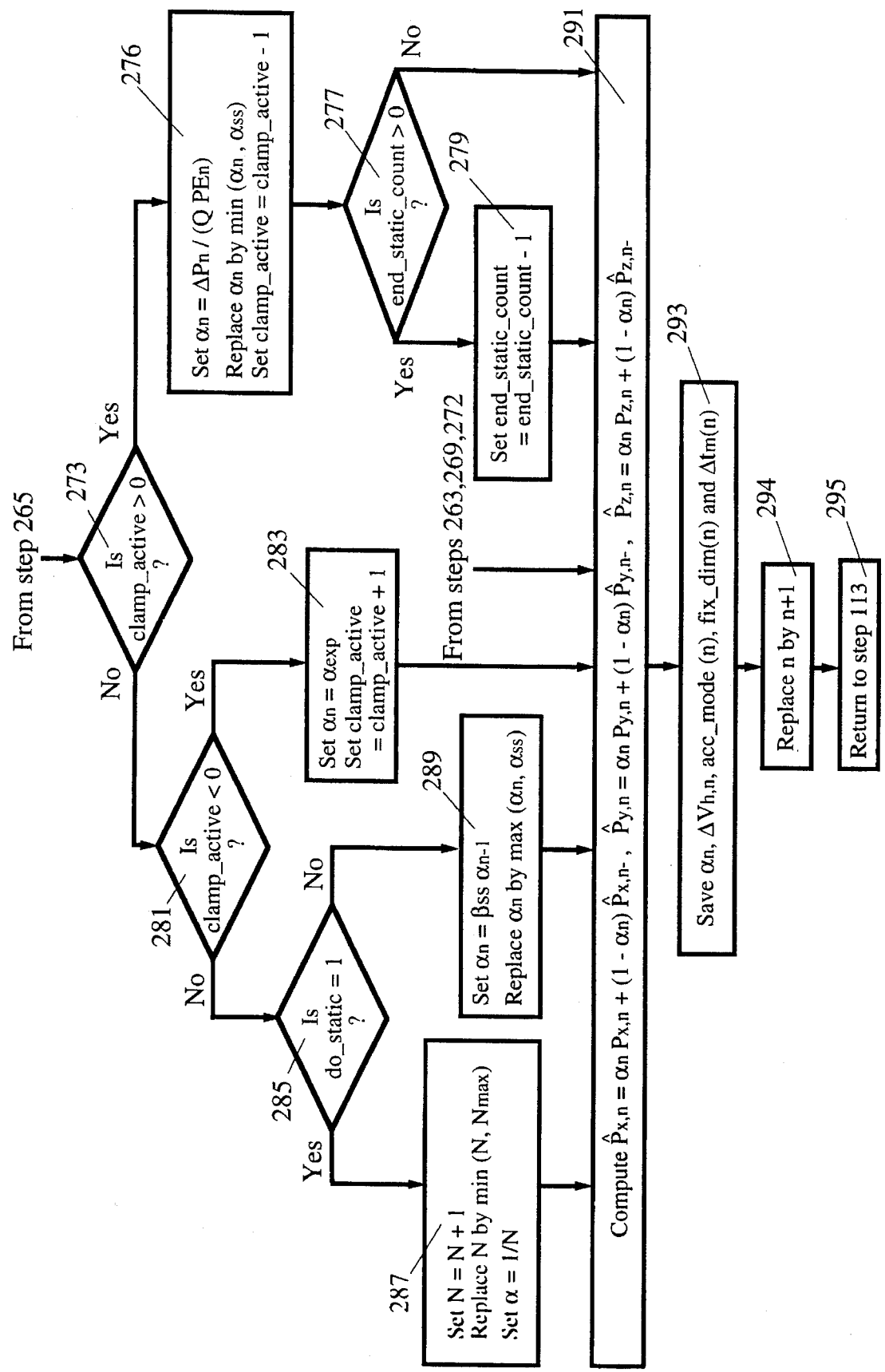

In an alternative to the embodiment illustrated in FIGS. 3A–3I, FIGS. 3H and 3I are replaced by FIGS. 3J and 3K. The clamping value of gain $\alpha_{cl}$, computed in step 271, and the gain value $\alpha_n$ used to approach a steady state value $\alpha_{SS}$ from the clamped value, computed in step 275 in FIG. 3I, are replaced by other computed values in steps 272 and 276. In the clamped state, the changes in location coordinates between two consecutive fixes at times t=t$_{n-1}$ and t=t$_n$ are computed by the relations $$\Delta P_{x,n} = (V_{x,n-1}+V_{x,n}) \Delta t_n/2, \quad (16)$$

$$\Delta P_{y,n} = (V_{y,n-1}+V_{y,n}) \Delta t_n/2, \quad (17)$$

$$\Delta P_{z,n} = (V_{z,n-1}+V_{z,n}) \Delta t_n/2. \quad (18)$$

One now chooses a positive number Q (1$\leq$Q—100; preferably, Q$\approx$8) and computes the present clamping value of $\alpha$ for the nth fix, denoted $\alpha_{cl,n}$, in step 272 by the relations $$\Delta P_n = \max\{|\Delta P_{x,n}|, |\Delta P_{y,n}|, |\Delta P_{z,n}|\}, \quad (19)$$

$$\alpha_{cl,n} = \Delta P_n/(Q \, PE_n) \quad (1\leq Q\leq 100). \quad (20)$$

Equation (20) also replaces the relation $\alpha_n$=$\beta_{cl}$ $\alpha_{n-1}$ in step 272, used to find $\alpha_n$ in terms of $\alpha_{n-1}$ in step 271 of FIGS. 3H–3I. Equation (20) would be applied for a selected time interval of length $\Delta t_{relief}$ or for a selected number N$_{relief}$ of consecutive data fixes in order to bring the filtered location coordinates P$^\Lambda_{x,n}$, P$^\Lambda_{y,n}$ and P$^\Lambda_{z,n}$ close to, or into approximate agreement with, the measured (unfiltered) location solutions P$_{x,n}$, P$_{y,n}$ and P$_{z,n}$, after this time interval of length $\Delta t_{relief}$ or (equivalently) run of N$_{relief}$ data fixes. The number N$_{relief}$ can replace the number [A$_n$+B$_n$]$_{int}$ computed in step 271 of FIGS. 3H–3I.

FIGS. 3J and 3K are a replacement of FIGS. 3H and 3I, with the clamping values of the gain $\alpha_{cl,n}$ computed as indicated in Eqs. (16)–(20). Steps 261, 263, 265, 267 and 269 in FIG. 3J are as in FIG. 3H. In step 267, the system determines if do_static=1? If the answer is yes, the system proceeds to step 269 as in FIGS. 3H–3I. If the answer is no, the system proceeds to step 272 (replacing step 271), computes $\alpha_{cl,n}$ as in Eq. (20), replaces $\alpha_{cl,n}$ by max($\alpha_{cl,n}$, $\alpha_{min}$), sets clamp_active=$N_{relief}$, and proceeds to step 291 as in FIGS. 3H–3I.

In step 273 of FIGS. 3J–3K, if clamp_active is not >0, the system proceeds to step 281, as in FIGS. 3H–3I. If clamp_active>0, the system proceeds to step 276 (replacing step 275), where $\alpha_{cl,n}$ is computed as in Eq. (20), $\alpha_{cl}$ is replaced by min($\alpha_{cl,n}$, $\alpha_{SS}$), clamp_active is decremented by one unit, and the system proceeds to step 277. Steps 273 and 277–295 in FIGS. 3J–3K are identical to the respective steps 273 and 277–295 in FIGS. 3H–3I.

Figure 4:
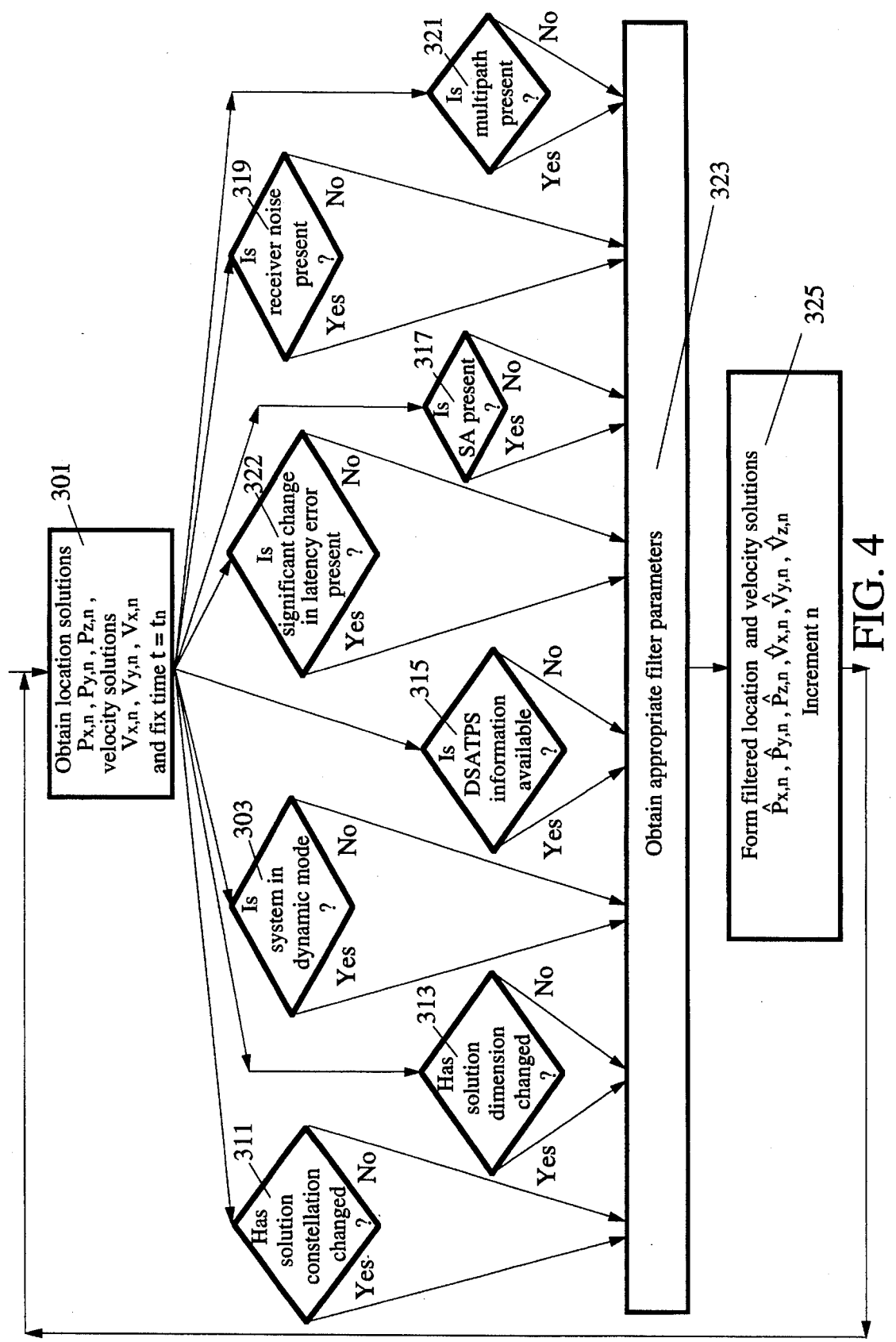
FIG. 4 illustrates, as a flow chart, a second embodiment of the invention.

FIG. 4 is an overview of another embodiment of the invention. In step 301, which corresponds to step 113 in FIG. 3A, the system generates two-dimensional or three-dimensional location coordinate solutions $P_{x,n}$, $P_{y,n}$, and $P_{z,n}$, and corresponding velocity coordinate solutions $V_{x,n}$, $V_{y,n}$, and $V_{z,n}$ with substantially no time lag in these solutions, when measurements are available from all satellites in the solution constellation. In step 303, the system determines whether it is in the dynamic mode or in the static mode. The system then determines if any of the following perturbations has occurred in the time fix interval $t_{n-1} < t \leq t_n$: (1) change of the satellites in the solution constellation (step 311), (2) change of the location solution from a three-dimensional solution to a two-dimensional solution (step 313), (3) change of the location solution from a two-dimensional solution to a three-dimensional solution (step 313), (4) availability, or loss of availability, of differential SATPS information (step 315), (5) appearance or disappearance of Selective Availability (step 317), (6) receiver noise at an SATPS receiver that receives the SATPS signals from the satellites in the solution constellation (step 319), (7) appearance or disappearance of multipath signals at the SATPS receiver (step 321), and (8) appearance of significant latency error (step 322). In step 323, the system determines one or more filter parameters from the information received from steps 303, 311, 313, 315, 317, 319, 321 and 322. In step 325, the system uses the appropriate filter parameter(s) for the situation to filter the location coordinates, to obtain sequences of location coordinates $\{P^A_{x,n}\}$, $\{P^A_{y,n}\}$, and $\{P^A_{z,n}\}$ that are smoothed to reduce discontinuities that occur due to one or more of the above-mentioned perturbations on the SATPS location solutions, increments n (n→n+1) and returns to step 301.

A Satellite Positioning System (SATPS) is a system of satellite signal transmitters, with receivers located on the Earth's surface or adjacent to the Earth's surface, that transmits information from which an observer's present location and/or the time of observation can be determined. Two operational systems, each of which qualifies as an SATPS, are the Global Positioning System and the Global Orbiting Navigational System.

The Global Positioning System (GPS) is part of a satellite-based navigation system developed by the United States Defense Department under its NAVSTAR satellite program. A fully operational GPS includes up to 24 satellites approximately uniformly dispersed around six circular orbits with four satellites each, the orbits being inclined at an angle of 55° relative to the equator and being separated from each other by multiples of 60° longitude. The orbits have radii of 26,560 kilometers and are approximately circular. The orbits are non-geosynchronous, with 0.5 sidereal day (11.967 hours) orbital time intervals, so that the satellites move with time relative to the Earth below. Theoretically, three or more GPS satellites will be visible from most points on the Earth's surface, and visual access to two or more such satellites can be used to determine an observer's position anywhere on the Earth's surface, 24 hours per day. Each satellite carries a cesium or rubidium atomic clock to provide timing information for the signals transmitted by the satellites. Internal clock correction is provided for each satellite clock.

Each GPS satellite transmits two spread spectrum, L-band carrier signals: an L1 signal having a frequency f1=1575.42 MHz and an L2 signal having a frequency f2=1227.6 MHz. These two frequencies are integral multiples f1=1540 f0 and f2=1200 f0 of a base frequency f0=1.023 MHz. The L1 signal from each satellite is binary phase shift key (BPSK) modulated by two pseudo-random noise (PRN) codes in phase quadrature, designated as the C/A-code and P-code. The L2 signal from each satellite is BPSK modulated by only the P-code. The nature of these PRN codes is described below.

One motivation for use of two carrier signals L1 and L2 is to allow partial compensation for propagation delay of such a signal through the ionosphere, which delay varies approximately as the inverse square of signal frequency f (delay$\propto f^{-2}$). This phenomenon is discussed by MacDoran in U.S. Pat. No. 4,463,357, which discussion is incorporated by reference herein. When transit time delay through the ionosphere is determined, a phase delay associated with a given carrier signal can be determined.

Use of the PRN codes allows use of a plurality of GPS satellite signals for determining an observer's position and for providing navigation information. A signal transmitted by a particular GPS signal is selected by generating and matching, or correlating, the PRN code for that particular satellite. All PRN codes are known and are generated or stored in GPS satellite signal receivers carried by ground observers. A first PRN code for each GPS satellite, sometimes referred to as a precision code or P-code, is a relatively long, fine-grained code having an associated clock or chip rate of 10 f0=10.23 MHz. A second PRN code for each GPS satellite, sometimes referred to as a clear/acquisition code or C/A-code, is intended to facilitate rapid satellite signal acquisition and hand-over to the P-code and is a relatively short, coarser-grained code having a clock or chip rate of f0=1.023 MHz. The C/A-code for any GPS satellite has a length of 1023 chips or time increments before this code repeats. The full P-code has a length of 259 days, with each satellite transmitting a unique portion of the full P-code. The portion of P-code used for a given GPS satellite has a length of precisely one week (7.000 days) before this code portion repeats. Accepted methods for generating the C/A-code and P-code are set forth in the document GPS Interface Control Document ICD-GPS-200, published by Rockwell International Corporation, Satellite Systems Division, Revision B, 3 Jul. 1991, which is incorporated by reference herein.

The GPS satellite bit stream includes navigational information on the ephemeris of the transmitting GPS satellite and an almanac for all GPS satellites, with parameters providing connections for ionospheric signal propagation delays suitable for single frequency receivers and for an offset time between satellite clock time and true GPS time. The navigational information is transmitted at a rate of 50 Baud. A useful discussion of the GPS and techniques for obtaining position information from the satellite signals is found in Tom Logsdon, *The NAVSTAR Global Positioning System*, Van Nostrand Reinhold, New York, 1992, pp. 1–90, incorporated by reference herein.

A second configuration for global positioning is the Global Orbiting Navigation Satellite System (GLONASS), placed in orbit by the former Soviet Union and now maintained by the Russian Republic. GLONASS also uses 24 satellites, distributed approximately uniformly in three orbital planes of eight satellites each. Each orbital plane has a nominal inclination of 64.8° relative to the equator, and the three orbital planes are separated from each other by multiples of 120° longitude. The GLONASS circular orbits have smaller radii, about 25,510 kilometers, and a satellite period of revolution of 8/17 of a sidereal day (11.26 hours). A GLONASS satellite and a GPS satellite will thus complete 17 and 16 revolutions, respectively, around the Earth every 8 days. The GLONASS system uses two carrier signals L1 and L2 with frequencies of f1=(1.602+9k/16) GHz and f2=(1.246+7k/16) GHz, where k (=0, 1, 2, . . . , 23) is the channel or satellite number. These frequencies lie in two bands at 1.597–1.617 GHz (L1) and 1,240–1,260 GHz (L2). The L1 code is modulated by a C/A-code (chip rate=0.511 MHz) and by a P-code (chip rate=5.11 MHz). The L2 code is presently modulated only by the P-code. The GLONASS satellites also transmit navigational data at at rate of 50 Baud. Because the channel frequencies are distinguishable from each other, the P-code is the same, and the C/A-code is the same, for each satellite. The methods for receiving and analyzing the GLONASS signals are similar to the methods used for the GPS signals.

Reference to a Satellite Positioning System or SATPS herein refers to a Global Positioning System, to a Global Orbiting Navigation System, and to any other compatible satellite-based system that provides information by which an observer's position and the time of observation can be determined, all of which meet the requirements of the present invention.

A Satellite Positioning System (SATPS), such as the Global Positioning System (GPS) or the Global Orbiting Navigation Satellite System (GLONASS), uses transmission of coded radio signals, with the structure described above, from a plurality of Earth-orbiting satellites. A single passive receiver of such signals is capable of determining receiver absolute position in an Earth-centered, Earth-fixed coordinate reference system utilized by the SATPS.

A configuration of two or more receivers can be used to accurately determine the relative positions between the receivers or stations. This method, known as differential positioning, is far more accurate than absolute positioning, provided that the distances between these stations are substantially less than the distances from these stations to the satellites, which is the usual case. Differential positioning can be used for survey or construction work in the field. providing location coordinates and distances that are accurate to within a few centimeters.

In differential position determination. many of the errors in the SATPS that compromise the accuracy of absolute position determination are similar in magnitude for stations that are physically close. The effect of these errors on the accuracy of differential position determination is therefore substantially reduced by a process of partial error cancellation.

An SATPS antenna receives SATPS signals from a plurality (preferably four or more) of SATPS satellites and passes these signals to an SATPS signal receiver/processor, which (1) identifies the SATPS satellite source for each SATPS signal, (2) determines the time at which each identified SATPS signal arrives at the antenna, and (3) determines the present location of the SATPS antenna from this information and from information on the ephemerides for each identified SATPS satellite. The SATPS signal antenna and signal receiver/processor are part of the user segment of a particular SATPS, the Global Positioning System, as discussed by Tom Logsdon in *The NAVSTAR Global Positioning System*, Van Nostrand Reinhold, 1992, pp. 33–90, incorporated by reference herein.

I claim:

1. A method for filtering and using time-varying location coordinates $P_{x,n}$, $P_{y,n}$ and $P_{z,n}$, determined by a Satellite Positioning System (SATPS), which operates in a static mode and in a dynamic mode, to determine the location of a mobile user of the SATPS and to reduce large discontinuities and control the rate at which a changing sequence of measurement errors can induce change in a sequence of the user's location solution coordinates, the method comprising the steps of:

(1) Setting an integer n=1 initially, using a location determination system (LDS), having an LDS antenna and an LDS receiver/processor that is connected to the LDS antenna and that includes a computer, to receive a plurality of SATPS signals and to generate initial location coordinate fixes $P_{x,n}$, $P_{y,n}$, and $P_{z,n}$, for n =1, initializing a first selected group of variables, including a weight coefficient or gain factor $\alpha_n$ ($0 \leq \alpha_n \leq 1.0$; initially $\alpha_1=1.0$), used for controlling the relative weighting of a new unfiltered location fix at a location fix time $t=t_n$ with a predicted value computed as the previous filtered position at time $t_{n-1}$ and projected forward to the present time with the average velocity at time $t_n$ and $t_{n-1}$; a steady state value $\alpha_{SS}$ of the gain ($0<\alpha_{SS}<1$), used when the difference between the new location fix and predicted location fix, known as the prediction error, is small; a minimum value $\alpha_{min}$ of the gain ($0<\alpha_{min}<1$), used when the prediction error is too high so that clamping of the gain is activated; a value $\alpha_{exp}$ of the gain ($0<\alpha_{exp}<1$), to be used in a partial expansion mode of the system when the predicted location based on the average velocity may not allow an accurate estimate of the present location solution coordinates; a value $\alpha_0$ ($0<\alpha_0 \leq 1$), used for the gain upon reset when large gaps in time occur between consecutive fix times $t_n$, or when the prediction error is too large, or when a large improvement in location accuracy occurs between consecutive location fixes; a counting integer N ($\geq 1$), used for counting consecutive fixes in a static mode; a selected location error threshold $PE_{thr}$; a maximum allowable location error $PE_{max}$; a maximum allowed time interval length $\Delta t_{max}$ during which no satellite signal measurements are received; a selected initial value of a variable, clamp_active(n), which is >0 if clamping is active, <0 if the system is in a partial expansion mode, and =0 in a normal dynamic mode; a selected initial value of a variable, static_count(n), used for counting the number of consecutive location fixes with velocity less than a threshold velocity $V_{h,thr}$ that is required for entry into the static mode; a selected value $\beta_{cl,n}>1$, used to control the incremental increase of the variable $\alpha_n$ toward a steady state value $\alpha_{SS}$ from a state in which clamping is present, where $\alpha_{SS}$=a selected positive value r30; and a selected value $\beta_{SS}$ ($0<\beta_{SS}<1$), used to control a second approach of the variable $\alpha_n$ from a reset value $\alpha$(reset) toward a steady state value $\alpha_{SS}$ in a normal dynamic mode of the SATPS, defining initial filtered location coordinates $P^A_{x,1}=P_{x,1}$, $P^A_{y,1}=P_{y,1}$ and $P^A_{z,1}=P_{z,1}$, and proceeding to step (46);

(2) for n≧2, using the LDS antenna and the LDS receiver/proceessor to receive a plurality Of SATPS signals and to generate new location coordinate fixes $P_{x,n}$, $P_{y,n}$, and $P_{z,n}$, new velocity coordinate fixes $V_{x,n}$, $V_{y,n}$, and $V_{z,n}$ that are independent of any previous fix information received, a new time coordinate $t_n$ for the time of this location fix, and values for variables last $\alpha(n)=\alpha_{n-1}$, last latency=$L_{n-1}$, static last fix(n)=1 if the preceding location fix (n−1) was in the static mode and =0 otherwise, last_hvel(n)=$V_{h,n-1}$, last_acc_mode(n)= acc_mode(n−1), last_fix_dim(n)=fix_dim(n−1), and last_$\Delta t_m$(n)=$\Delta t_m$(n−1) for variables computed for the preceding location fix;

(3) computing the horizontal component $V_{h,n}$ of velocity and the change in horizontal velocity $\Delta V_{h,n}=|V_{h,n}-V_{h,n-1}|$ from the data obtained in step (2);

(4) choosing a first set of values of filter variables including: req_static_count=a selected positive value r13, a selected value of static_count required for entry into the static mode; a selected present value of do_static(n), which=1 if the static mode is activated, and=0 otherwise; a selected present value of a variable fix_dim(n)=2 or 3, according to whether the available SATPS geometry allows a 2-dimensional horizontal solution or a 3-dimensional location solution; a selected present clamping value $\alpha_{cl,n}$ of the gain, with $0 < \alpha_{cl,n} < 1$, to be used when the prediction error is too high; a selected present value for a variable, new_clamp(n), which=1 if clamping is activated at the nth fix, and=0 otherwise; a selected present value of a variable new_fix_set(n), which=1 if a dimension change (2-dimensional to 3-dimensional or 3-dimensional to 2-dimensional) or a satellite constellation change occurred at the nth fix, and=0 otherwise; a selected present value of a variable DSATPS_ON(n), which=1 if differential satellite positioning system information is available at the time of the nth fix, and =0 otherwise; a selected present value of a variable SA_OFF(n), which=1 if Selective Availability is inactivated at the time of the nth fix, and=0 otherwise; a selected present value for a variable acc_mode(n), which is equal to the logical or Boolean sum; {DSATPS_ON(n)) OR (SA_OFF(n))}; a selected present value of a variable, PDOP(n), representing the predicted dilution-of-precision determined from SATPS signals received from a selected constellation of SATPS satellites; a selected present value of a variable $\Delta t_m(n)$=max $\{t_n-t_{m1}, t_n-t_{m2}, \ldots, t_n-t_{mM}\}$, where $t_{mi}$ is the time of the most recent pseudorange measurement made from the i-th satellite that forms part of the satellite solution constellation at time $t_n$, with $t_{mi} \leq t_n$ (i=1, 2, ..., M); and a selected value of a variable, B2G(n), that determines when the gain $\alpha_n$ is to be reset if a selected condition is true;

(5) determining if acc_mode(n)=1 at the nth fix; when acc_mode(n)=1, setting the following values for the indicated variables: $N_{min}(n)$=r1, $N_{max}(n)$=r2, $V_{h,thr}(n)$= r3 (m/sec), $\Delta V_{h,thr}(n)$=r4 (m/sec), $\beta_{cl,n}$=r5, and $\sigma_{meas}(n)$=r6, $\sigma_{pos}(n)$=PDOP(n)×$\sigma_{meas}(n)$; when acc_mode(n)=0, setting the following values for the indicated variables: $N_{min}(n)$=r7, $N_{max}(n)$=r8, $V_{h,thr}(n)$=r9 (m/sec), $\Delta V_{h,thr}(n)$=r10 (m/sec), $\beta_{cl,n}$=r11, $\sigma_{meas}(n)$= r12, and $\sigma_{pos}(n)$=PDOP(n)×$\sigma_{meas}(n)$, where r1, r2, r3, r4, r5, r6, r7, r8, r9, r10, r11 and r12 are selected positive values with r1 $\leq$r7, r2$\leq$r8, r3$\leq$r9, r4$\leq$r10, r5$\geq$r11>1, and r6—r12;

(6) setting do static(n)=0;

(7) testing if the horizontal velocity is below the static mode threshold by determining if the condition $V_{h,n}<V_{h,thr}$ is true; when $V_{h,n}<V_{h,thr}$ is true, incrementing static_count(n) by 1 and proceeding to step (8); otherwise, continuing to step (8);

(8) determining if static mode was active in the last fix by determining if {(static_last_fix(n)=1) AND ($\Delta V_{h,n}<\Delta V_{h,thr}$)} is true; when this condition is satisfied, setting do_static(n)=1, setting clamp_active(n)=0, and proceeding to step (13); otherwise, continuing to step (9);

(9) determining if static mode was active in the last fix; if {static last fix(n)=1) AND ($\Delta V_{h,n}<\Delta V_{h,thr}$)} is true, setting static count(n) =0; if {(static last fix(n)=1) AND ($\Delta V_{h,n}\geq \Delta V_{h,thr}$)} is true, or if {static last fix(n)$\neq$1) AND (static count(n)=req static count)} is true, setting do static(n)=1 and setting clamp active(n)=0; if {static last fix(n)$\neq$1) AND (static count(n)$\neq$req static count)} is true, continuing to step (10);

(10) determining if do_static(n)=1; when this condition is satisfied, setting last_hvel(n+1)=$V_{h,n}$, setting $V_{x,n}$= $V_{y,n}$=$V_{z,n}$=0, replacing N by max(N, $N_{min}$) and proceeding to step (12); otherwise proceeding to step (11);

(11) determining if static_last_fix(n)=1; when this condition is not satisfied, proceeding to step (12); otherwise, setting new_clamp(n)=1, setting end_static_count(n)=a selected positive integer r14, where end_static_count(n) is a countdown integer used for exiting from the static mode, and continuing to step (12);

(12) setting $\Delta t_n=t_{n-1}$;

(13) determining if do_static(n)=1; when this condition is satisfied, setting $P^\wedge_{x,n}{}^-=P^\wedge_{x,n-1}$, $P^\wedge_{y,n}{}^-=P^\wedge_{y,n-1}$ and $P^\wedge_{z,n}{}^-=P^\wedge_{z,n-1}$; Otherwise, setting $P^\wedge_{x,n}{}^-=P^\wedge_{x,n-1}+(V_{x,n}+V_{x,n-1})\Delta t_n/2$, setting $P^\wedge_{y,n}{}^-=P^\wedge_{y,n-1}+(V_{y,n}+V_{y,n-1})\Delta t_n/2$ and setting $P^\wedge_{z,n}{}^-=P^\wedge_{z,n-1}+(V_{z,n}+V_{z,n-1})\Delta T_n/2$;

(14) computing $PE_n$=max $\{|P_{x,n}-P^\wedge_{x,n}{}^-|, |P_{y,n}-P^\wedge_{y,n}{}^-|, |P_{z,n}-P^\wedge_{z,n}{}^-|\}$;

(15) computing $\delta V_n$=max $\{|V_{x,n}-V_{x,n-1}|, |V_{y,n}-V_{y,n-1}|, |V_{z,n}-V_{z,n-1}|\}$;

(16) computing $\Delta t_L(n)$=max $\{\Delta t_n, \Delta t_m(n), \Delta t_m(n-1)\}$;

(17) determining if $\Delta t_n \geq \Delta t_{max}$, where $\Delta t_{max}$=a selected positive value r28; when this condition is satisfied, proceeding to step (25); otherwise, continuing to step (18);

(18) determining if $PE_n \geq PE_{max}$; when this condition is satisfied, proceeding to step (25); otherwise, continuing to step (19);

(19) determining if {(fix_dim(n)=3) AND (first_3D_fix(n)=1)} is true; when this condition is satisfied, proceeding to step (25); otherwise, proceeding to step (20);

(20) determining if B2G(n)$\neq$1; when this condition is satisfied, proceeding to step (24); otherwise, continuing to step (21);

(21) determining if {(first_DSATPS_fix(n)=1) AND (acc_mode(n−1)=1)} is true; when this condition is satisfied, proceeding to step (25); otherwise, continuing to step (22);

(22) determining if {(PDOP(n)<r15 PDOP(n−1)) AND (fix_dim(n)=fix_dim(n−1)) AND (PDOP(n−1)$\geq$r16)} is true, where r15 and r16 are selected positive values; when this condition is satisfied, proceeding to step (25); otherwise, continuing to step (23);

(23) determining if {($PE_n\geq$r17 $\sigma_{pos}(n)$) AND (fix_dim(n)=3) AND (fix_dim(n−1)=2)} is true, where r17 is a selected positive value; when this condition is satisfied, continuing to step (25); otherwise, continuing to step (24);

(24) setting reset_filter(n)=0 and proceeding to step (26);

(25) setting reset_filter(n)=1, and setting the gain $\alpha_n$ equal to the value $\alpha_0$;

(26) determining if {(clamp_active(n)>0) AND ($\alpha_{SS}$ $PE_n<PE_{thr}/r18$) AND (end_static_count(n)=0)} is true, where r18 is a selected positive value; when this condition is satisfied, setting clamp_active(n)=0; otherwise, continuing to step (27);

(27) determining if {(clamp_active(n)<0) AND ($PE_n \geq r19$ last_latency)} is true, where r19 is a selected positive value; when this condition is satisfied, setting clamp_active(n)=0; otherwise, continuing to step (28);

(28) determining if $PE_n \geq PE_{thr}$; if the condition is not met, proceeding to step (45); otherwise, continuing to step (29);

(29) computing a latency variable $L_n = \delta V_n \Delta t_L(n)/2$, to estimate the maximum location error that has occurred due to presence of non-zero acceleration;

(30) replacing the latency $L_n$ by $\min(L_n, r20)$, where r20 is a selected positive value;

(31) determining if $PE_n < r21 L_n$, where r21 is a selected positive value; when this condition is not satisfied, proceeding to step (33); otherwise, continuing to step (32);

(32) determining if {{(acc_mode(n)=0) AND ($L_n \geq r22$)} OR {acc_mode(n)=1 AND $L_n \geq r23$}} is true; when this condition is satisfied, setting clamp_active(n)=−r24, setting last_latency=$L_n$, and proceeding to step (35), where r22, r23 and r24 are selected positive values; otherwise, continuing to step (33);

(33) determining if $\alpha_n PE_n < PE_{thr}$; when this condition is not satisfied, continuing to step (35); otherwise, continuing to step (34);

(34) determining if (clamp_active(n)=0) OR {(new_fix_set(n)=1) AND (clamp_active(n)>0)} is true; when this condition is satisfied, setting new_clamp(n)=1; otherwise, continuing to step (35);

(35) determining if reset_filter(n)=1; when this condition is not satisfied, continuing to step (36); otherwise, setting $\alpha=\alpha_0$, setting clamp_active(n)=0, setting end_static_count(n)=0, setting $N=N_{min}$, and proceeding to step (45);

(36) determining if new_clamp(n)=1; when this condition is not satisfied, proceeding to step (40); otherwise, continuing to step (37);

(37) determining if do_static(n)=1; when this condition is not satisfied, proceeding to step (39); otherwise, continuing to step (38);

(38) setting $N=[r25\ PE_n]_{int}$, where r25 is a selected positive value, replacing N by $\min(N, N_{max})$, setting $\alpha_n=1/N$, setting clamp_active(n)=0, and proceeding to step (45);

(39) setting $\alpha_{cl,n}=K_n/PE_n$, setting $\alpha_n=\max(\alpha_{cl,n}, \alpha_{min})$, where $\alpha_{min}$ is a selected small positive value r29, setting clamp_active (n)=$R_n$, where $K_n$ and $R_n$ are selected positive numbers that may depend on n, and proceeding to step (45);

(40) determining if clamp_active(n)>0; when this condition is not satisfied, proceeding to step (43); otherwise, continuing to step (41);

(41) setting $\alpha_n=J_n$, replacing $\alpha_n$ by $\max(\alpha_{n-1}, \alpha_{SS})$, and setting clamp_active(n)=clamp_active(n)−1, where $J_n$ is a selected positive number that depends upon n;

(42) determining if end_static_count(n)>0; when this condition is satisfied, setting end_static_count(n)= end_static_count(n)−1 and proceeding to step (45); otherwise, continuing to step (43);

(43) determining if clamp_active(n)<0; when this condition is not satisfied, continuing to step (44); otherwise, setting $\alpha_n=\alpha_{exp}$, where $\alpha_{exp}$ is a selected positive value r31, setting clamp_active(n)=clamp_active(n)+1, and proceeding to step (45);

(44) determining if do_static(n)=1; when this condition is satisfied, setting N=N+1, replacing N by $\min(N, N_{max})$, setting $\alpha_n=1/N$, and continuing to step (45); otherwise, setting $\alpha_n=\beta_{SS}\alpha_{n-1}$, where $\beta_{SS}$ is a selected positive value r32, replacing $\alpha_n$ by $\max(\alpha_n, \alpha_{SS})$, and continuing to step (45);

(45) computing filtered location coordinates $P^\wedge_{x,n}$, $P^\wedge_{y,n}$ and $P^\wedge_{z,n}$ by the relations
$P^\wedge_{x,n} = \alpha_n P_{x,n} + (1-\alpha_n) P^\wedge_{x,n}{}^-$,
$P^\wedge_{y,n} = \alpha_n P_{y,n} + (1-\alpha_n) P^\wedge_{y,n}{}^-$,
$P^\wedge_{z,n} = \alpha_n P_{z,n} + (1-\alpha_n) P^\wedge_{z,n}{}^-$;

(46) setting last $\alpha=\alpha_n$, last latency=$L_n$, last PDOP =PDOP(n), last_hvel(n+1)=$V_{h,n}$, last_acc_mode(n+1)=acc_mode(n), last_fix_dim(n+1)=fix_dim(n) and last_$\Delta t_m$(n+1)=$\Delta t_m$(n);

(47) replacing integer n by n+1;

(48) returning to step (2) at least once: and

(49) causing the LDS receiver/processor to assist the mobile SATPS user in navigating from a first selected location to a second selected location by replacing the location coordinates ($P_{x,n}$, $P_{y,n}$, $P_{z,n}$) by the filtered location coordinates ($P^\wedge_{x,n}$, $P^\wedge_{y,n}$, $P^\wedge_{z,n}$) and by displaying these filtered location coordinates for at least one mobile user location other than the first and second selected locations.

2. The method of claim 1, further comprising the steps of:

choosing said number $K_n$ in step (39) to be=$PE_{thr}/r26$, where r26=a positive number satisfying $1 \leq r26 \leq 100$;

choosing said number $R_n$ in step (39) to be=$[A_n + B_n]_{int}$, where $A_n=\ln\{PE_{thr}/(r27\alpha_{SS} PE_n)\}/\ln\{1-\alpha_{SS}\}$ and $B_n=\ln\{\alpha_{SS}/\alpha_n\}/\ln\{\beta_{cl}\}$, where r27=a selected positive value; and choosing said number $J_n$ in step (41) to be=$\beta_{cl}\alpha_{n-1}$.

3. The method of claim 2, further comprising the step of: choosing said value r26=8 and choosing said value r27=2.

4. The method of claim 1, further comprising the steps of:

choosing said number $K_n$ in Step (39) to be=$\Delta P_n/O$, where O is a selected positive number and $\Delta P_n=\max\{|(V_{x,n}+V_{x,n-1}|\Delta t_n/2, |(V_{y,n}+V_{y,n-1}|\Delta t_n/2, |(V_{z,n}+V_{z,n-1}|\Delta t_n/2\}$;

choosing said number $R_n$ in step (39) to be=$N_{relief}$ where $N_{relief}$=a selected positive value satisfying $N_{relief} \geq 10$; and choosing said number $J_n$ in step (41) to be=$\Delta P_n/(O\ PE_n)$.

5. The method of claim 1, further comprising the steps of choosing said selected constants rk (k=1, 2, . . . , 26 and 29–32) to be the following values and ranges of values:

r1=1, r2=100, r3=0.1 r4=0.2, r5=1.5, r6=2–8, r7=1000, r8=$10^6$, r9=1.1,
r10=0.5,
r11=1.125,
r12=16–32,
r13=2,
r14=20–60,
r15=2,
r16=6,
r17=6,
r18=2,
r19=2,
r20=30,
r21=2,
r22=8,
r23=16,
r24=4–12,
r25=16,
r26=1–100,
r29=0.001,
r30=0.0625,
r31=0.2,
r32=0.5.

6. A method for filtering and using time-varying location coordinates $P_{x,n}$, $P_{y,n}$ and $P_{z,n}$, determined by a Satellite Positioning System (SATPS), which operates in a static mode and in a dynamic mode, to determine the location of a mobile user of the SATPS and to reduce large discontinuities and control the rate at which a changing sequence of measurement errors can induce change in a sequence of the user's location coordinates, the method comprising the steps of:

(1) causing a location determination system (LDS), having an LDS antenna and an LDS receiver/processor that is connected to the LDS antenna and that includes a computer, to receive SATPS signals from a plurality of SATPS satellites and to generate SATPS unfiltered location coordinate solutions $P_{x,n}$, $P_{y,n}$ and $P_{z,n}$, and SATPS velocity coordinate solutions $V_{x,n}$, $V_{y,n}$, and $V_{z,n}$ for a sequence of at least three selected location fix times $t=t_n$, where $t_{n-1} < t_n$ (n=2,3, ... ), with substantially no time lag in these solutions, for a mobile SATPS user, when recent measurements are available from all satellites in a selected solution constellation;

(2) setting the integer n=1 and causing the LDS receiver/processor to define predicted location coordinates
$P^A_{x,1} = P_{x,1}$,
$P^A_{y,1} = P_{y,1}$,
$P^A_{z,1} = P_{z,1}$, (3) for $n \geq 2$, causing the receiver/processor to form predicted location coordinates $P^A_{x,n}{}^-$, $P^A_{y,n}{}^-$, and $P^A_{z,n}{}^-$ that are defined by the relations
$P^A_{x,n}{}^- = P^A_{x,n-1} + (V_{x,n} + V_{x,n-1}) \Delta t_n / 2$,
$P^A_{y,n}{}^- = P^A_{y,n-1} + (V_{y,n} + V_{y,n-1}) \Delta t_n / 2$,
$P^A_{z,n}{}^- = P^A_{z,n-1} + (V_{z,n} + V_{z,n-1}) \Delta t_n / 2$,
$\Delta t_n = t_n - t_{n-1}$;

(4) causing the receiver/processor to form filtered location coordinates $P^A_{x,n}$, $P^A_{y,n}$ and $P^A_{z,n}$ that are defined by the relations
$P^A_{x,n} = \alpha_n P_{x,n} + (1-\alpha_n) P^A_{x,n}{}^-$,
$P^A_{y,n} = \alpha_n P_{y,n} + (1-\alpha_n) P^A_{y,n}{}^-$,
$P^A_{z,n} = \alpha_n P_{z,n} + (1-\alpha_n) P^A_{z,n}{}^-$,
where $\alpha_n$ is a selected weight coefficient that satisfies the constraint $0 < \alpha_n \leq 1$;

(5) selecting the weight coefficients $\alpha_n$ to reduce discontinuities that occur with a changing set of measurement errors caused by at least one of the following perturbing events; (i) change of the satellites in the solution constellation, (ii) change of the location coordinate solution from a three-dimensional solution to a two-dimensional solution, (iii) change of the location coordinate solution from a two-dimensional solution to a three-dimensional solution, (iv) change in availability of differential SATPS information, (v) appearance or disappearance of Selective Availability, (vi) appearance or disappearance of receiver noise in satellite measurements used in the location coordinate solution. (vii) appearance or disappearance of multipath signals on satellite measurements used at the SATPS receiver, and (viii) a significant change in a latency error for any location coordinate or velocity coordinate of the solution: and (6) replacing the integer n by the integer n+1 and repeating steps (3), (4) and (5) aat least once;

(7) causing the receiver/processor to assist the mobile SATPS user in navigating from a first selected locatign to a second selected location by replacing the location coordinates $(P_{x,n}, P_{y,n}, P_{z,n})$ by the filtered location coordinates $(P^A_{x,n}, P^A_{y,n}, P^A_{z,n})$ and by displaying these filtered location coordinates for at least one mobile user location other than the first and second selected locations.

7. The method of claim 6, further comprising the step of allowing said selected weight coefficients $\alpha_n$ to vary with said fix time $t_n$.

8. The method of claim 7, comprising the step of choosing said weight coefficients $1-\alpha_n$ for said predicted location coordinates $P_{x,n}{}^-$, $P_{y,n}{}^-$, and $P_{z,n}{}^-$ to be larger than said weight coefficients $\alpha_n$ for said location coordinate solutions $P_{x,n}$, $P_{y,n}$ and $P_{z,n}$ in said linear combinations, when said respective predicted location coordinates $P_{x,n}{}^-$, $P_{y,n}{}^-$, and $P_{z,n}{}^-$ differ from said respective unfiltered location coordinate solutions $P_{x,n}$, $P_{y,n}$ and $P_{z,n}$ by more than a selected threshold amount.

9. The method of claim 7, further comprising the step of allowing said linear combinations to converge to steady state location coordinate solutions when said weight coefficients $\alpha_n$ approach steady state values.

10. The method of claim 9, wherein said filter weights $\alpha_n$ have steady state values in the dynamic mode and steady state values in the static mode, the method further comprising the step of choosing said weight coefficients $\alpha_n$ so that said filtered location coordinates approach said respective SATPS location coordinate solutions, and thereby become increasingly accurate, the longer said SATPS remains in a steady state mode.

11. The method of claim 7, further comprising the step of allowing at least one of said filtered location coordinate sequences to migrate at a low, controllable rate from a first location coordinate sequence, corresponding to a first set of SATPS location coordinate solutions $P_{x,n}^{(1)}$, $P_{y,n}^{(1)}$, and $P_{z,n}^{(1)}$, to a second location coordinate sequence, corresponding to a second set of SATPS location coordinate solutions $P_{x,n}^{(2)}$, $P_{y,n}^{(2)}$, and $P_{z,n}^{(2)}$.

12. The method of claim 11, further comprising the step of delaying said migration of said at least one filtered location coordinate sequence from said first location coordinate sequence to said second location coordinate sequence for a selected hold-off time interval, in order to minimize net migration of said filtered location coordinate sequence to said second location coordinate sequence when said SATPS-determined location coordinate solutions move briefly to said second set of SATPS location coordinate solutions and then return to said first set of SATPS location coordinate solutions.

13. The method of claim 12, further comprising the step of allowing migration of said at least one filtered location coordinate sequence from said first location coordinate sequence to said second location coordinate sequence in a controlled and gradual manner, in order to move toward a steady-state location solution at said second location sequence if said SATPS location coordinate solutions remain in said second set of SATPS location sequence.

14. The method of claim 7, further comprising the step of allowing said weights to vary with said location fix time $t_n$ as a function of a present prediction error, which is defined as the difference between said unfiltered location coordinate solutions and said respective predicted location coordinates.

15. The method of claim 7, further comprising the step of setting said SATPS velocity coordinate solutions $V_{x,n}$, $V_{y,n}$, and $V_{z,n}$ equal to zero whenever said SATPS is in a static mode.

16. The method of claim 7, further comprising the step of assigning the SATPS to a static mode whenever the magnitudes of said SATPS velocity coordinate solutions $V_{x,n}$, $V_{y,n}$, and $V_{z,n}$, are smaller than a selected velocity threshold for a selected number of consecutive location fix times $t=t_n$.

17. The method of claim 16, further comprising the step of allowing said SATPS to remain in a static mode, even if one or more of the present SATPS velocity solution values exceeds said velocity threshold, if said SATPS was in the static mode at the preceding location fix time $t=t_{n-1}$, and the time rate of change of said velocity coordinate solutions between the preceding location fix time $t=t_{n-1}$, and the present location fix time $t=t_n$ is smaller than a selected velocity time-rate-of-change threshold.

18. The method of claim 7, further comprising the step of assigning the SATPS to a static mode whenever the magnitude of a horizontal velocity $V_{h,n}$, formed from said SATPS velocity solutions $V_{x,n}$, $V_{y,n}$, and $V_{z,n}$, is smaller than a selected velocity threshold for a selected number of consecutive location fix times $t=t_n$.

19. The method of claim 18, further comprising the step of allowing said SATPS to remain in a static mode, even if said horizontal velocity magnitude $V_{h,n}$ exceeds said selected velocity threshold, if said SATPS was in the static mode at the preceding location fix time $t=t_{n-1}$, and the time rate of change of said horizontal component $V_{h,n}$ between the preceding location fix time $t=t_{n-1}$, and the present location fix time $t=t_n$ is smaller than a selected velocity time-rate-of-change threshold.

20. The method of claim 6, wherein said weight coefficient $\alpha_n$ has a steady state value $\alpha_{SS}$ in a dynamic mode, the method further comprising the steps of:

reducing the value of said weight coefficient $\alpha_n$ to a selected positive initial static mode value $\alpha_{min,1} < \alpha_{SS}$ at time $t=t_{n0}$, whenever said SATPS makes a transition at this time from the dynamic mode to a static mode; and allowing said weight coefficient $\alpha_n$ to decrease monotonically toward a value $\alpha_{min,2} < \alpha_{min,1}$ for subsequent location fix times $t=t_r$ (r>n0), to reduce any allowed changes in said filtered location coordinates while the system is in the static mode.

21. The method of claim 6, wherein said weight coefficient $\alpha_n$ has a steady state value $\alpha_{SS}$ in a dynamic mode, the method further comprising the steps of:

setting the value of said weight coefficient $\alpha_n$ equal to a selected value $\alpha_{clamp} < \alpha_{SS}$ at time $t=t_{n0}$ whenever said SATPS makes a transition at this time from a static mode to a dynamic mode; and holding the value of said weight coefficient $\alpha_n$ at the value $\alpha_{clamp}$ for subsequent fix times $t=t_r$ (r>n0) for a selected time interval, then allowing said weight coefficient $\alpha_n$ to increase toward the value $\alpha_{SS}$, to limit any change in said filtered location coordinates that does not arise from a non-zero velocity of said system.

22. The method of claim 6, further comprising the step of choosing said weight coefficients $\alpha_n$ so that $(1-\alpha_n) \approx 1$ for said predicted location coordinates $P^{\wedge}_{x,n}{}^-$, $P^{\wedge}_{y,n}{}^-$ and $P^{\wedge}_{z,n}{}^-$, when at least one of the location difference magnitudes $|P^{\wedge}_{x,n}{}^- - P_{x,n}|$, $|P^{\wedge}_{y,n}{}^- - P_{y,n}|$ and $|P^{\wedge}_{z,n}{}^- - P_{z,n}|$ exceeds a selected threshold difference amount, to limit any changes in said filtered location coordinates when at least one of these location difference magnitudes is larger than the threshold difference amount.

23. The method of claim 21, further comprising the steps of:

determining a latency error in said SATPS location coordinate solutions and said velocity coordinate solutions; and increasing said weight coefficient $\alpha_n$ to a value $\alpha_{exp} > \alpha_{SS}$ for a selected time interval, to reduce the latency error in said SATPS location coordinate solutions at a greater rate than would occur if said weight coefficient $\alpha_n$ were set equal to said steady state value $\alpha_{SS}$.

* * * * *